(12) United States Patent
Maezawa et al.

(10) Patent No.: US 8,885,194 B2
(45) Date of Patent: Nov. 11, 2014

(54) IMAGE FORMING SYSTEM, IMAGE FORMING APPARATUS, TRANSMISSION APPARATUS, AND NON-TRANSITORY COMPUTER READABLE MEDIUM FOR TRANSMITTING INFORMATION BETWEEN NETWORK PRINTING DEVICES

(75) Inventors: Toshiyuki Maezawa, Kanagawa (JP); Tomokazu Yoshimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 154 days.

(21) Appl. No.: 13/440,731

(22) Filed: Apr. 5, 2012

(65) Prior Publication Data

US 2013/0100488 A1    Apr. 25, 2013

(30) Foreign Application Priority Data

Oct. 25, 2011  (JP) ................................ 2011-234227

(51) Int. Cl.
*G06F 3/12* (2006.01)
*G06K 15/00* (2006.01)

(52) U.S. Cl.
CPC .............. *G06F 3/121* (2013.01); *G06F 3/1261* (2013.01); *G06F 3/1291* (2013.01)
USPC .......................................... 358/1.15; 358/1.1

(58) Field of Classification Search
CPC .......... H04N 1/32438; H04N 1/32502; H04N 1/32507; H04N 1/32523; H04N 1/4413; H04N 1/4433; H04N 1/00244; H04N 2201/001; H04N 2201/0027; H04N 2201/0039; H04N 2201/0094; H04N 2201/3288; H04N 2201/3295; H04N 2201/3298; G06F 15/02; G06F 15/026; G06F 15/025; G06F 15/1814; G06F 15/4045; G06F 15/1859

USPC .............. 358/1.1, 3.28, 1.14, 1.15, 1.18, 402, 358/400; 709/201, 213, 248, 249

See application file for complete search history.

(56) References Cited

U.S. PATENT DOCUMENTS

| 8,405,852 | B2 * | 3/2013 | Noguchi et al. ............. 358/1.15 |
| 8,634,758 | B2 * | 1/2014 | Sato .............................. 399/407 |
| 2005/0052686 | A1 * | 3/2005 | Maruyama ................... 358/1.15 |
| 2007/0201082 | A1 * | 8/2007 | Fukui et al. .................. 358/1.15 |

FOREIGN PATENT DOCUMENTS

JP    A-2001-047706    2/2001

* cited by examiner

*Primary Examiner* — Gabriel Garcia
(74) *Attorney, Agent, or Firm* — Oliff PLC

(57) ABSTRACT

An image forming system includes at least one transmission apparatus, and plural image forming apparatuses, wherein the transmission apparatus includes a transmission section that transmits printing data to a first image forming apparatus of the plural image forming apparatuses, wherein the first image forming apparatus includes a receiving section that receives printing data from the transmission apparatus or other image forming apparatuses, and a printing data transmission section that transmits the printing data or substantially identical printing data generated on the basis of the printing data, to the image forming apparatuses other than the own apparatus among the plural image forming apparatuses, when printing data which is substantially identical to the printing data received by the receiving section cannot be acquired from the image forming apparatuses corresponding to the predefined reference number among the plural image forming apparatuses.

17 Claims, 24 Drawing Sheets

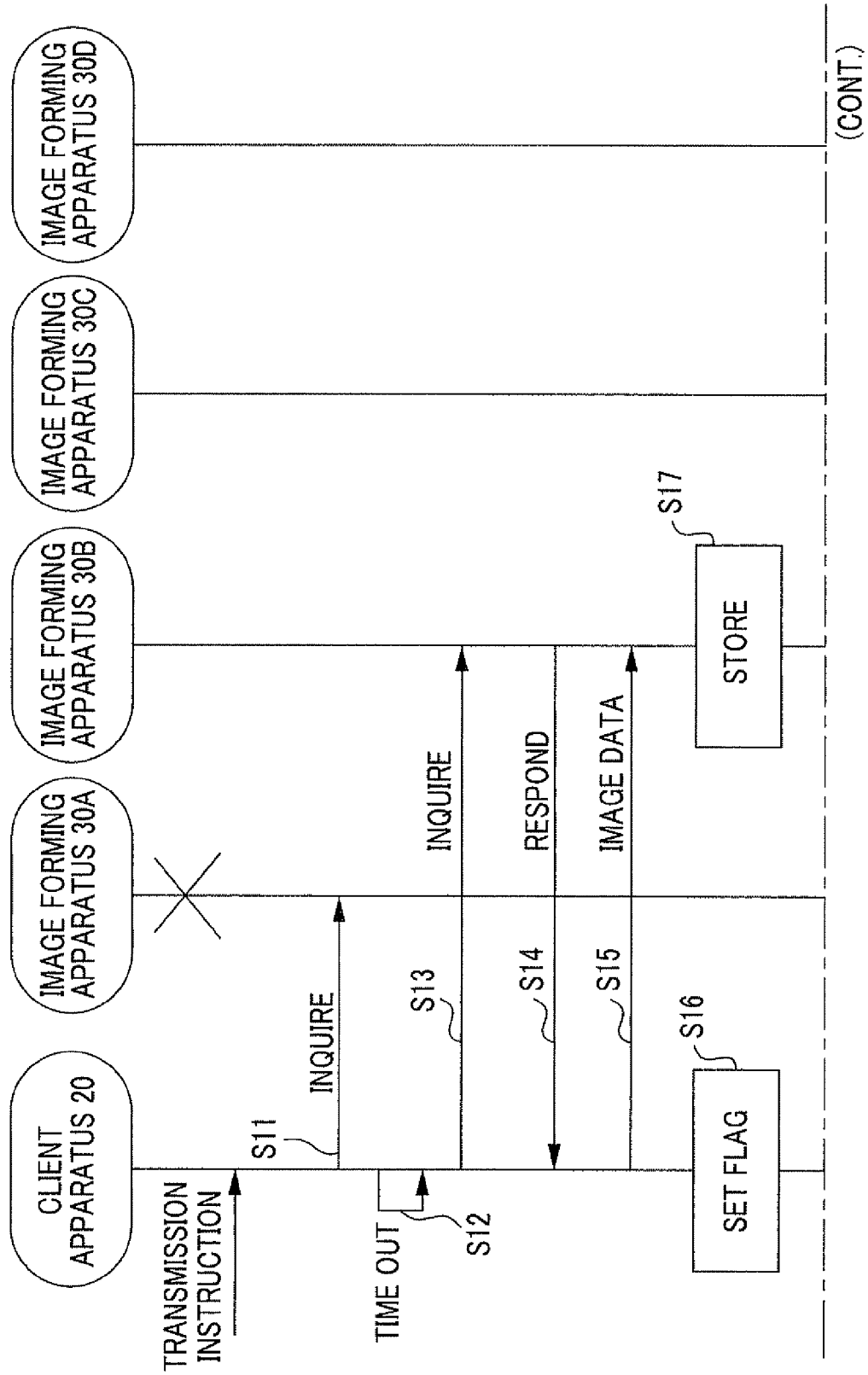

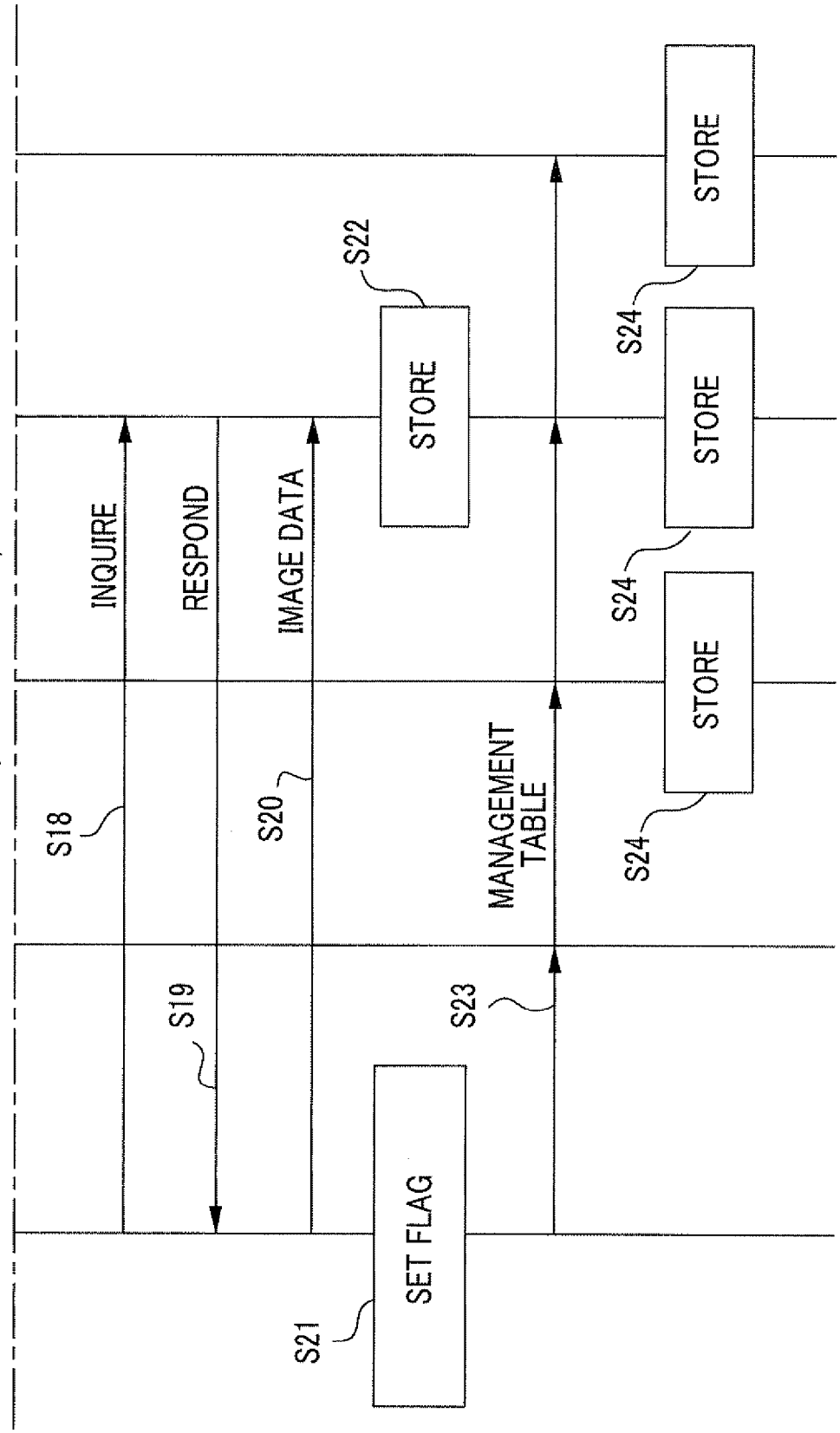

FIG. 9

| USER ID | PRIORITY | COMMUNICATION ADDRESS | FLAG |
|---|---|---|---|
| userA | 1 | 192.168.1.a | |
| | 2 | 192.168.1.b | ○ |
| | 3 | 192.168.2.c | ○ |
| | 4 | 192.168.2.d | |

41

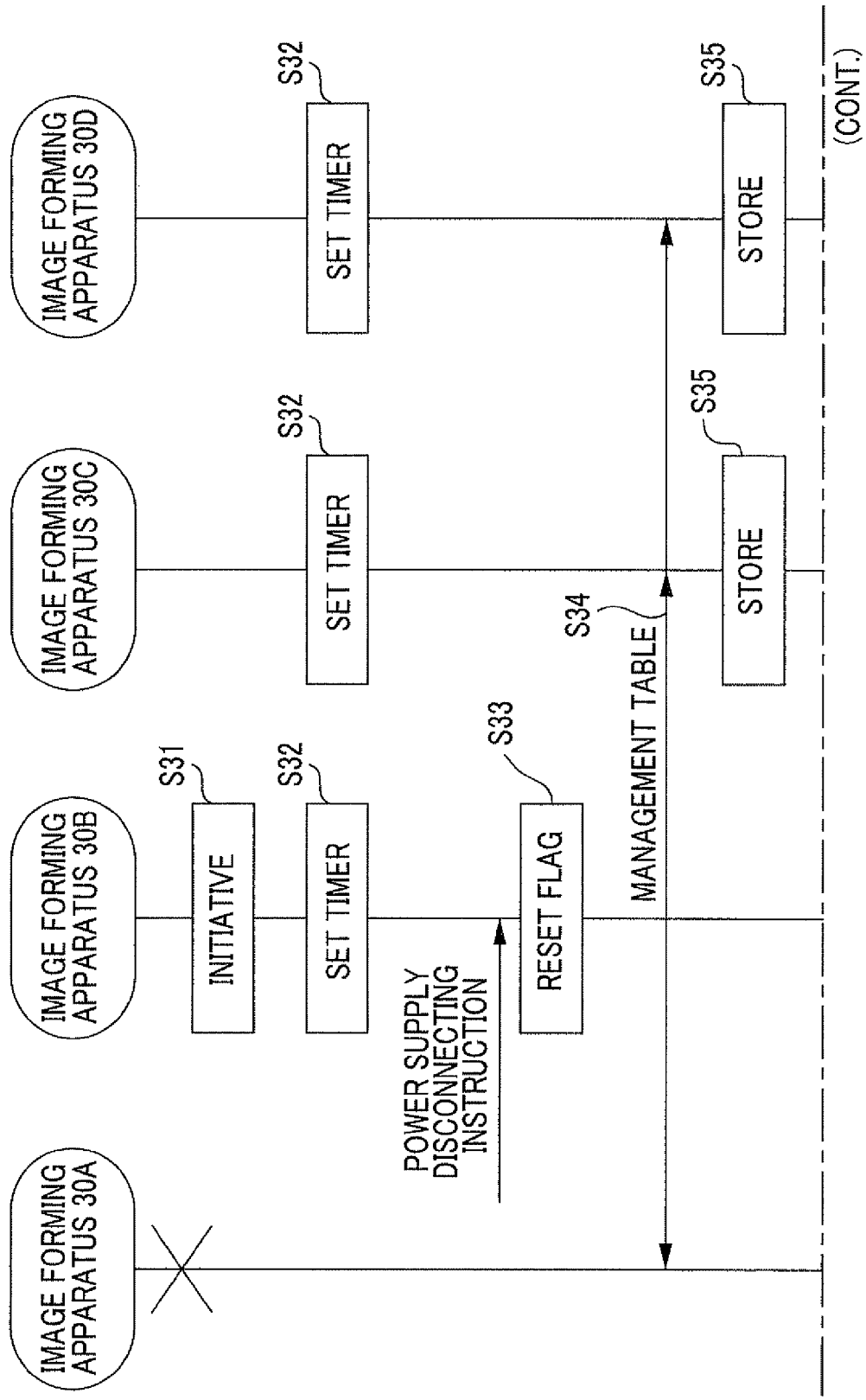

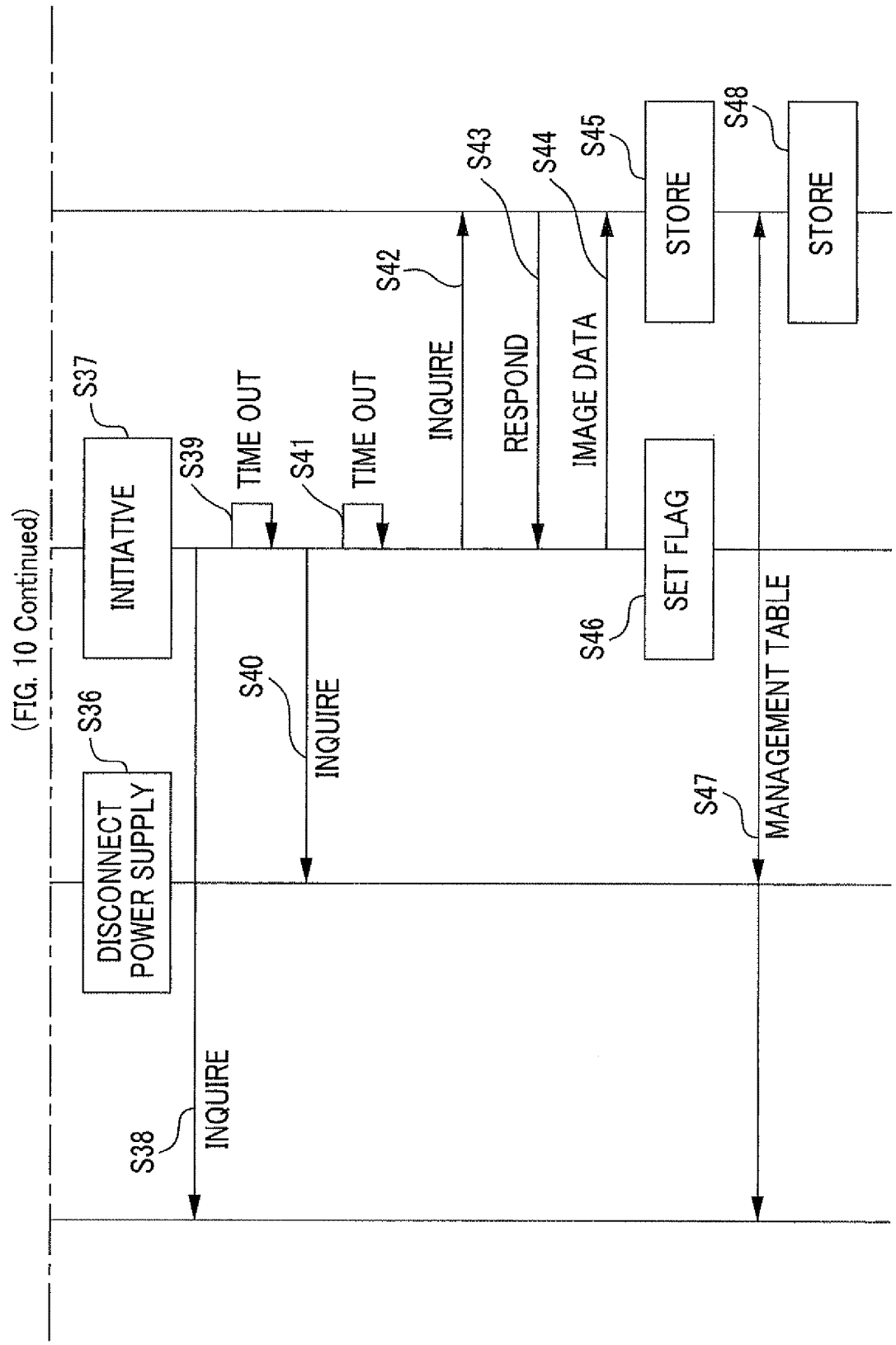

| USER ID | PRIORITY | COMMUNICATION ADDRESS | FLAG |
|---|---|---|---|
| userA | 1 | 192.168.1.a | |
| | 2 | 192.168.1.b | |
| | 3 | 192.168.2.c | ○ |
| | 4 | 192.168.2.d | |

FIG. 12

| USER ID | PRIORITY | COMMUNICATION ADDRESS | FLAG |
|---|---|---|---|
| userA | 1 | 192.168.1.a | |
| | 2 | 192.168.1.b | |
| | 3 | 192.168.2.c | ○ |
| | 4 | 192.168.2.d | ○ |

41

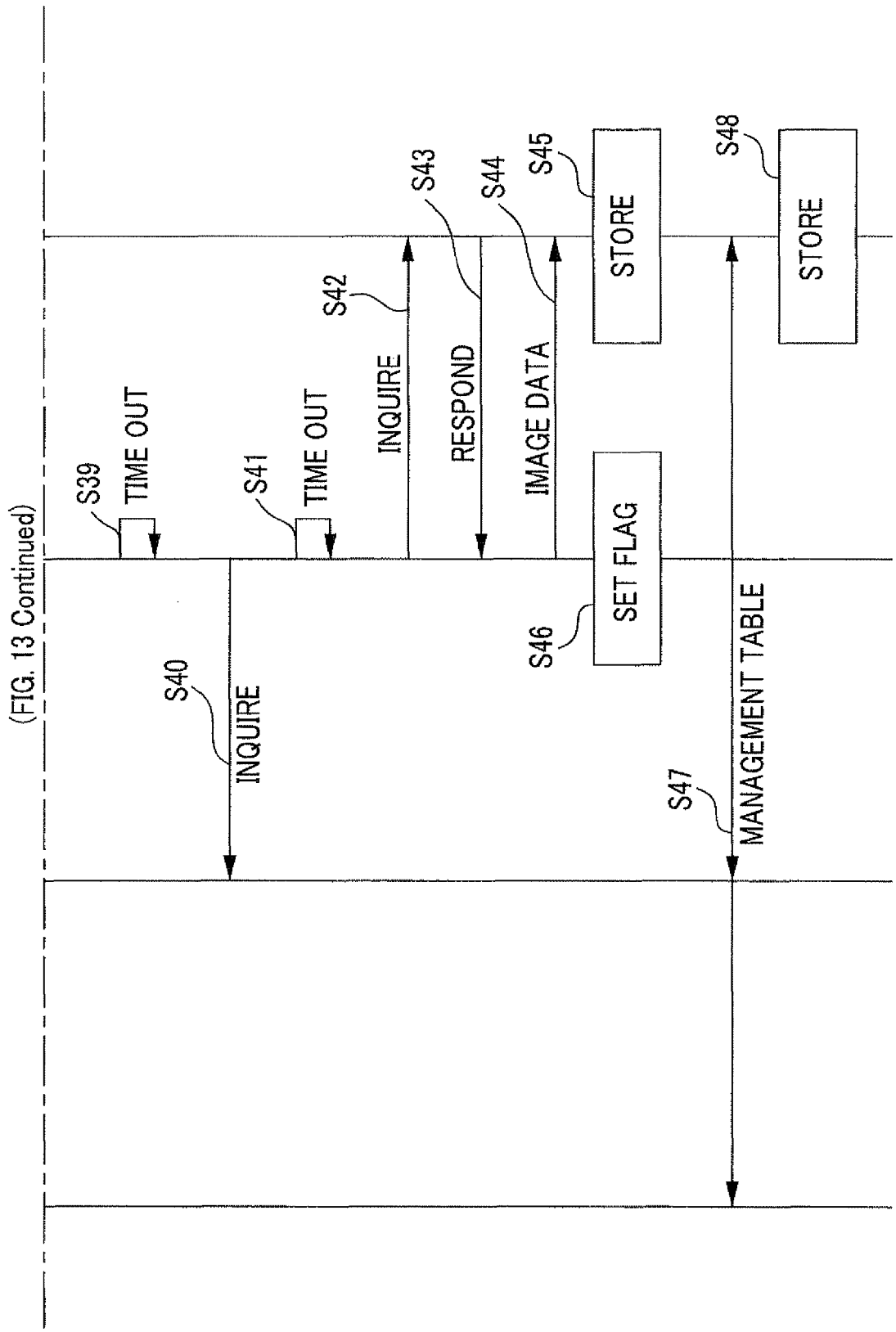

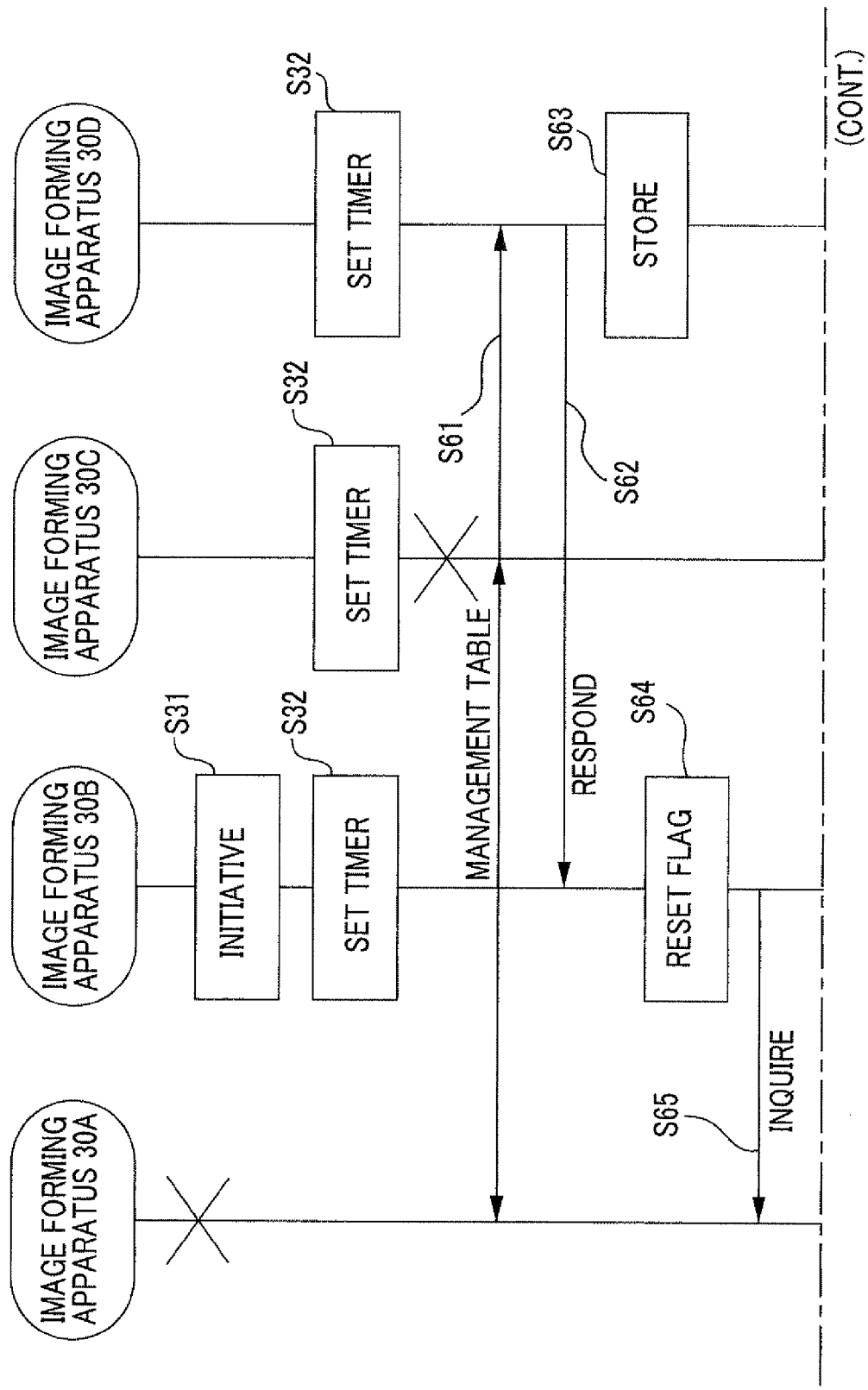

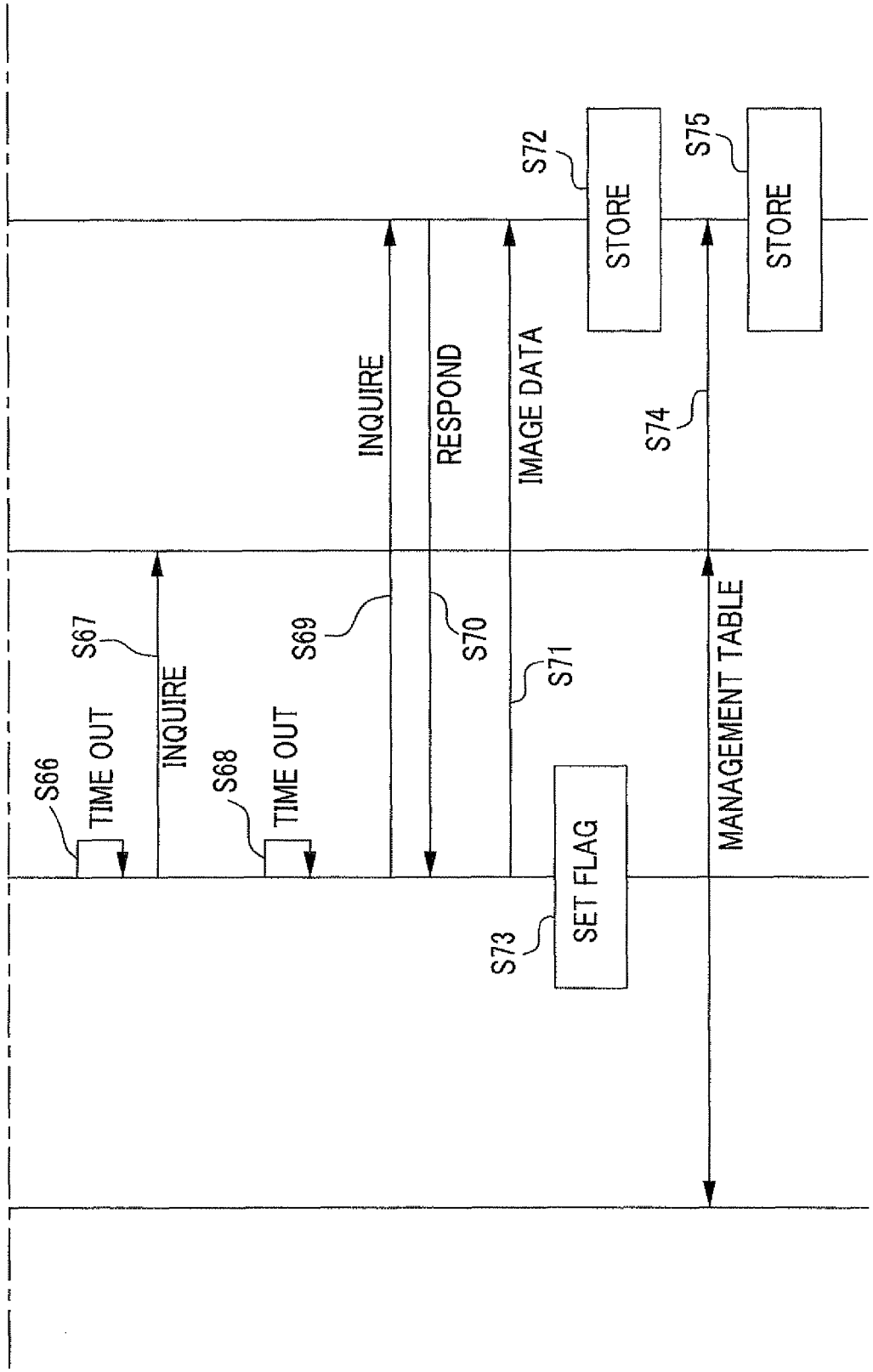

FIG. 15

| USER ID | PRIORITY | COMMUNICATION ADDRESS | FLAG |
|---|---|---|---|
| userA | 1 | 192.168.1.a | |
| | 2 | 192.168.1.b | ○ |
| | 3 | 192.168.2.c | |
| | 4 | 192.168.2.d | |

41

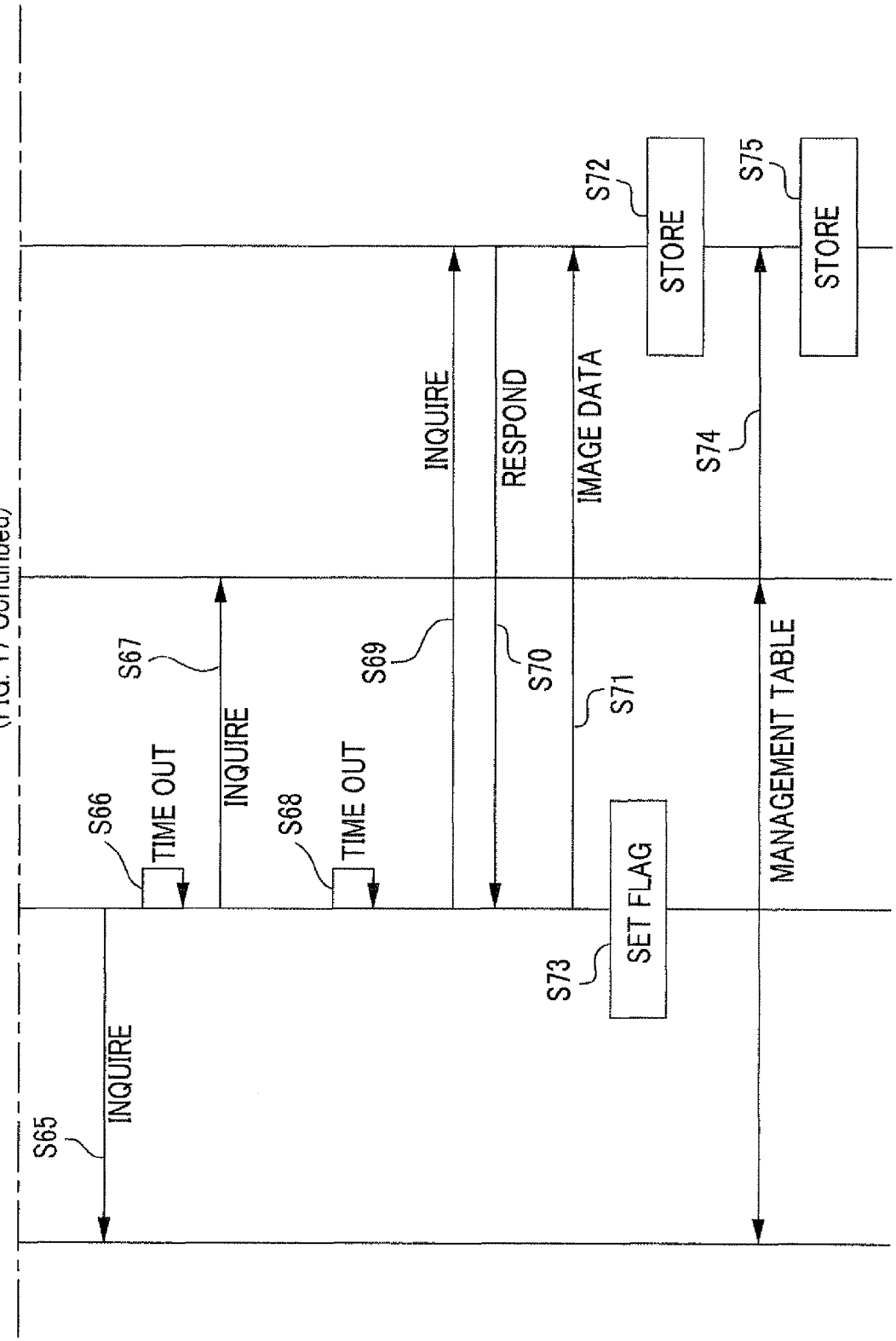

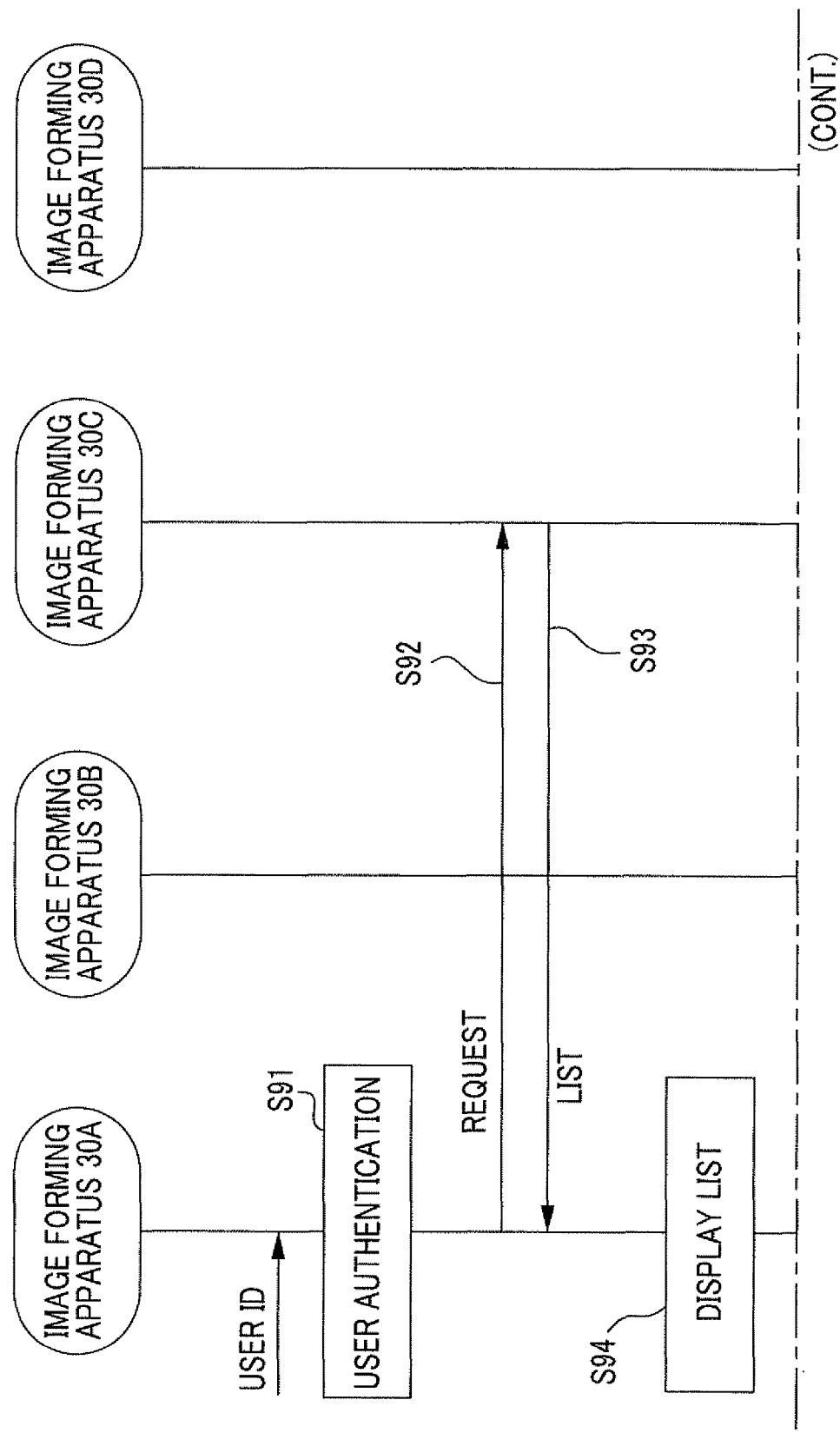

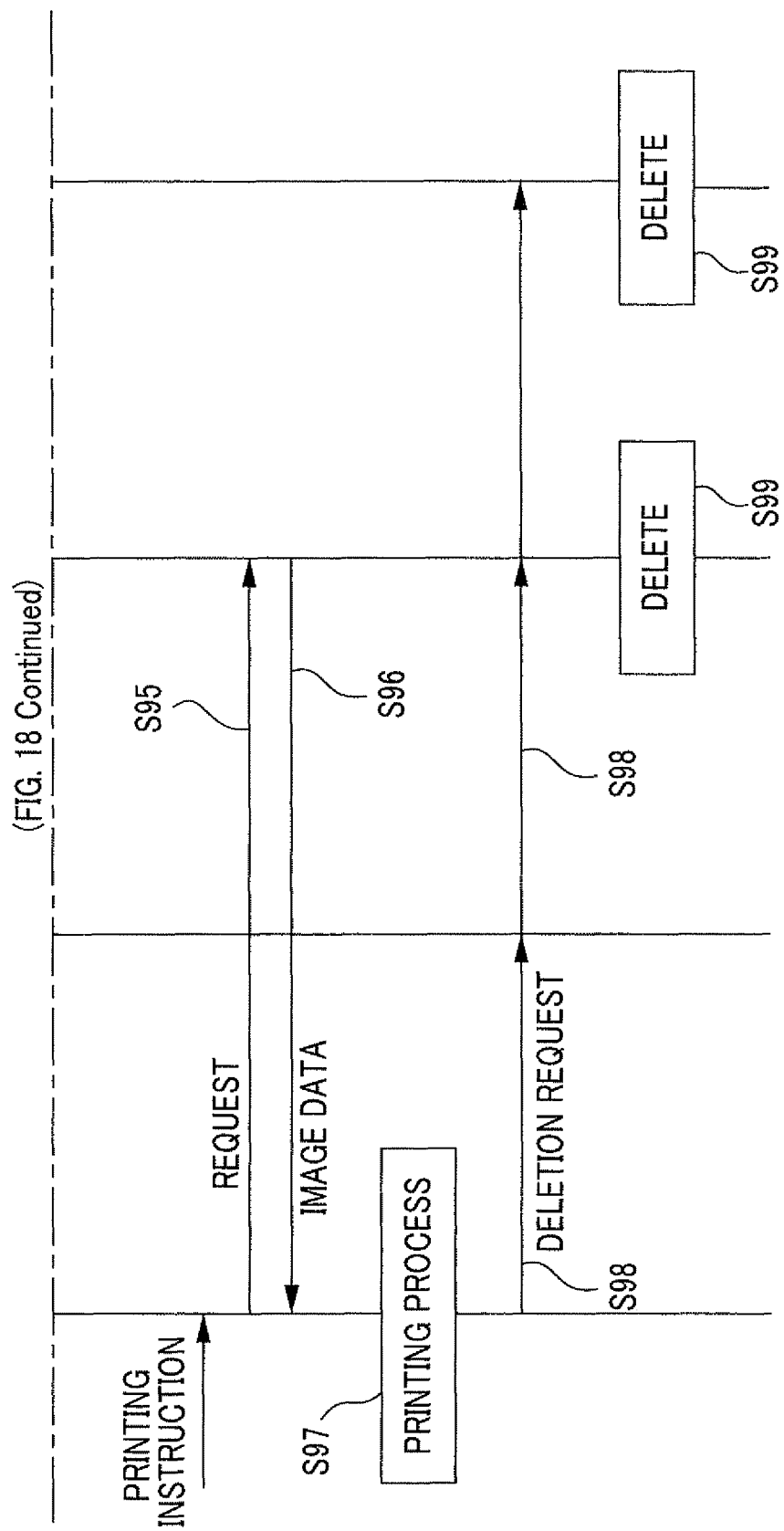

IMAGE FORMING SYSTEM, IMAGE FORMING APPARATUS, TRANSMISSION APPARATUS, AND NON-TRANSITORY COMPUTER READABLE MEDIUM FOR TRANSMITTING INFORMATION BETWEEN NETWORK PRINTING DEVICES

CROSS-REFERENCE TO RELATED APPLICATIONS

This application is based on and claims priority under 35 USC 119 from Japanese Patent Application No. 2011-234227 filed Oct. 25, 2011.

BACKGROUND (i) Technical Field

The present invention relates to an image forming system, an image forming apparatus, a transmission apparatus, and a non-transitory computer readable medium.

(ii) Related Art

There has been proposed a system capable of continuously providing a printing service even if parts of image forming apparatuses are out of order by providing plural image forming apparatuses.

SUMMARY

According to an aspect of the invention, there is provided an image forming system including at least one transmission apparatus, and plural image forming apparatuses, wherein the transmission apparatus includes a transmission section that transmits printing data to a first image forming apparatus of the plural image forming apparatuses, wherein the first image forming apparatus includes a receiving section that receives printing data from the transmission apparatus or other image forming apparatuses, a printing data transmission section that transmits the printing data or substantially identical printing data generated on the basis of the printing data, to the image forming apparatuses other than the own apparatus among the plural image forming apparatuses, when printing data which is substantially identical to the printing data received by the receiving section cannot be acquired from the image forming apparatuses corresponding to the predefined reference number among the plural image forming apparatuses, and an apparatus information transmission section that transmits apparatus information regarding the image forming apparatus which receives the printing data to the plural image forming apparatuses, and wherein each of the plural image forming apparatuses includes an apparatus information receiving section that receives the apparatus information transmitted by the apparatus information transmission section, an acquisition section that acquires the printing data on the basis of the received apparatus information in case that the printing data is used by a user, and an image forming section that performs image formation according to the printing data acquired by the acquisition section.

BRIEF DESCRIPTION OF THE DRAWINGS

Exemplary embodiments of the present invention will be described in detail based on the following figures, wherein:

FIG. 8 is a sequence diagram illustrating a transmission operation of image data;

FIG. 9 is a diagram illustrating a management table after being updated;

FIG. 10 is a sequence diagram illustrating a forwarding operation of image data;

FIG. 12 is a diagram illustrating a management table after being updated;

FIG. 14 is a sequence diagram illustrating a forwarding operation of image data;

FIG. 15 is a diagram illustrating a management table after being updated;

FIG. 18 is a sequence diagram illustrating a printing operation.

DETAILED DESCRIPTION

1. Configuration of Image Forming Apparatus

Figure 1:
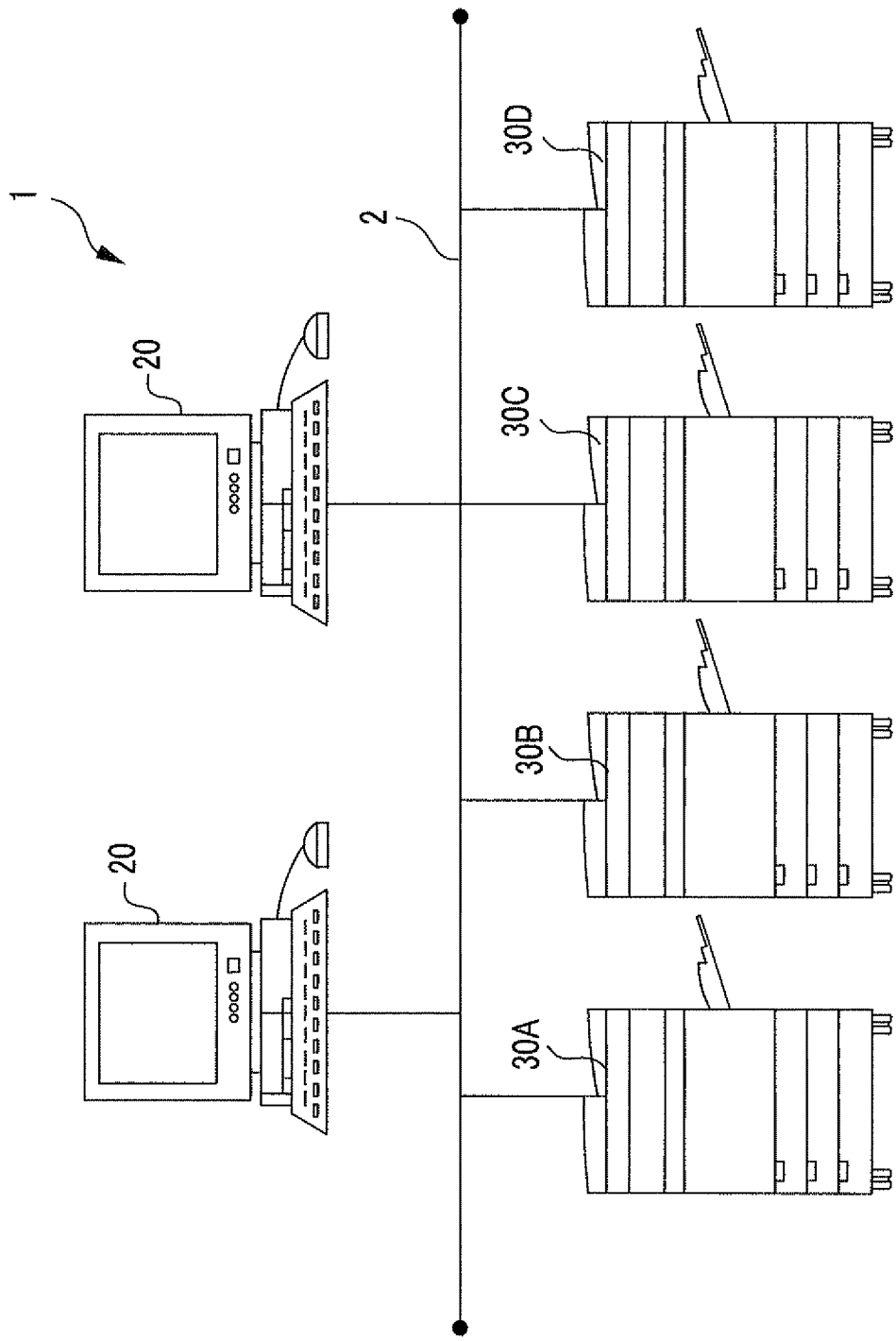
FIG. 1 is a diagram illustrating a configuration of the image forming system according to an exemplary embodiment.

FIG. 1 is a diagram illustrating an image forming system 1 according to an exemplary embodiment. The image forming system 1 includes plural client apparatuses 20, and image forming apparatuses 30A, 30B, 30C and 30D. The client apparatuses 20 and the image forming apparatuses 30A, 30B, 30C and 30D are connected to each other via a communication line 2. In addition, in the following, in cases where it is not necessary to differentiate the image forming apparatuses 30A, 30B, 30C and 30D from each other, the apparatuses are collectively referred to as "an image forming apparatus 30" or "image forming apparatuses 30".

Figure 2:
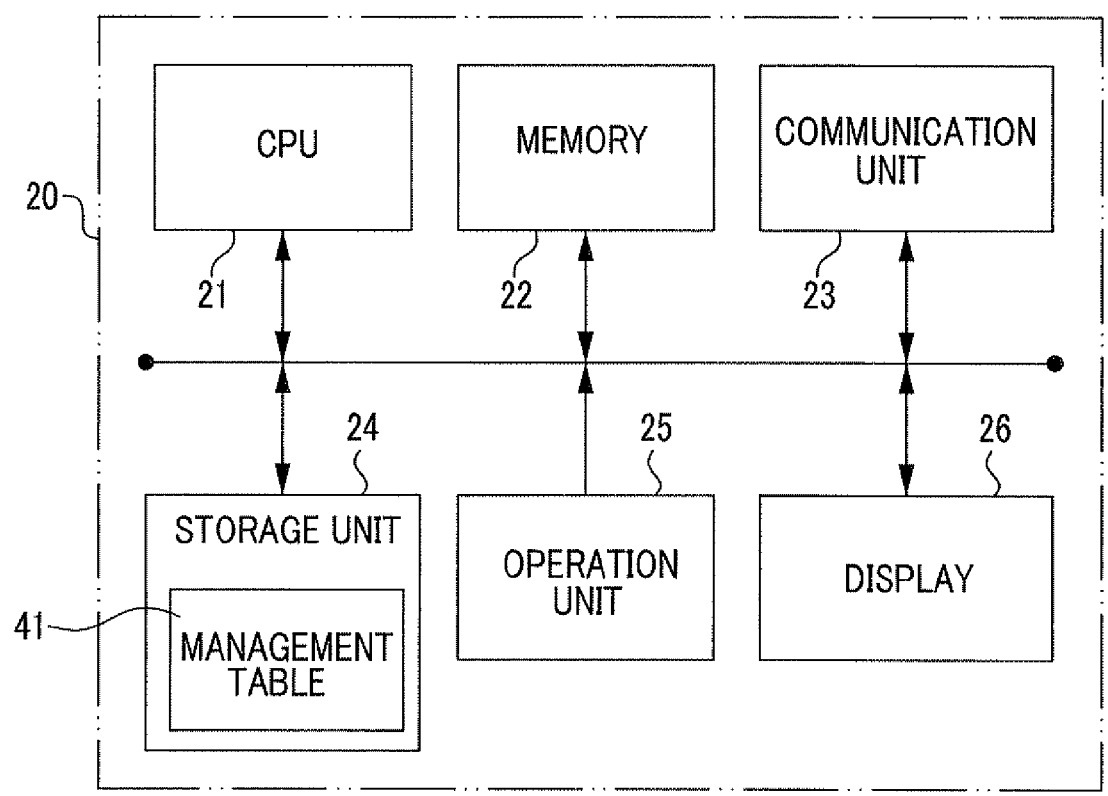
FIG. 2 is a diagram illustrating a hardware configuration of the client apparatus.

FIG. 2 is a diagram illustrating a hardware configuration of the client apparatus 20. The client apparatus 20 includes a CPU (Central Processing Unit) 21, a memory 22, a communication unit 23, a storage unit 24, an operation unit 25, and a display 26. The CPU 21 controls the respective units of the client apparatus 20 by executing a program stored in the memory 22. The communication unit 23 is a communication interface connected to the communication line 2. The client apparatus 20 communicates with the image forming apparatus 30 using the communication unit 23. The storage unit 24 is a storage device such as a hard disk. The storage unit 24 stores a management table 41 created for each user who uses the image forming system 1. The operation unit 25 includes, for example, a keyboard and a mouse. The operation unit 25 is used to operate the client apparatus 20. The display 26 is a display device such as a liquid crystal display device.

Figure 3:
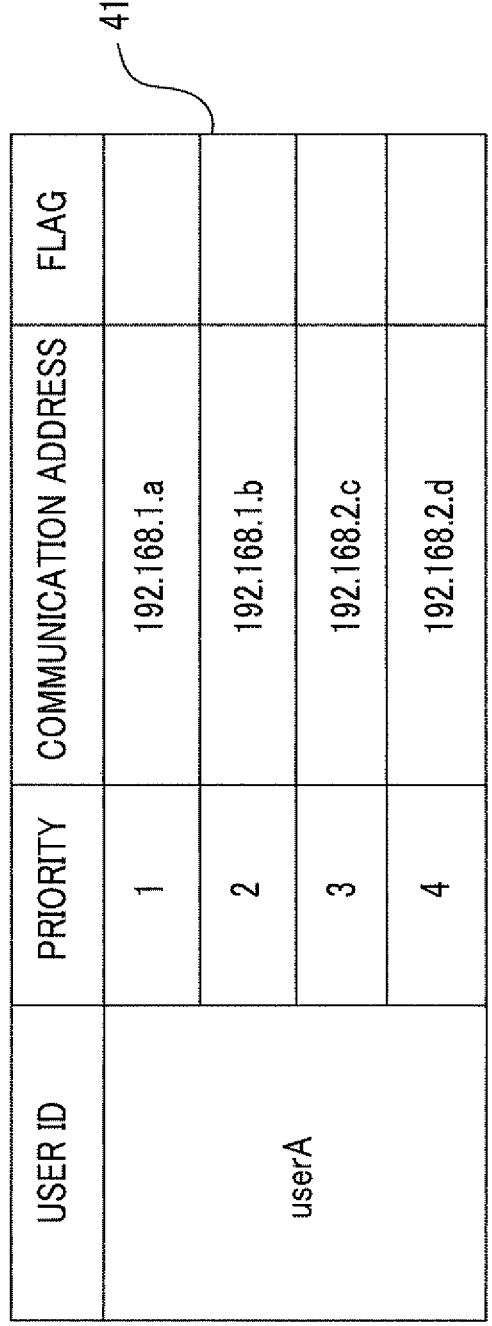
FIG. 3 is a diagram illustrating an example of the management table.

FIG. 3 is a diagram illustrating an example of the management table 41. In the management table 41, user ID, a priority, a communication address, and a flag are correlated with each other and are stored. The user ID is information for identifying a user. The priority is assigned to the image forming apparatus 30. The priority is predefined, for example, for each user. The communication address is an identification number assigned to the image forming apparatus 30. As the communication address, for example, an IP (Internet Protocol) address is used. The image forming apparatuses 30A, 30B, 30C and 30D are assumed to be respectively assigned communication addresses, "192.168.1.a", "192.168.1.b", "192.168.2.c", and "192.168.2.d". The flag is information indicating that image data is stored in the image forming apparatus 30. The flag is set when image data is stored in the image forming apparatus 30.

Figure 4:
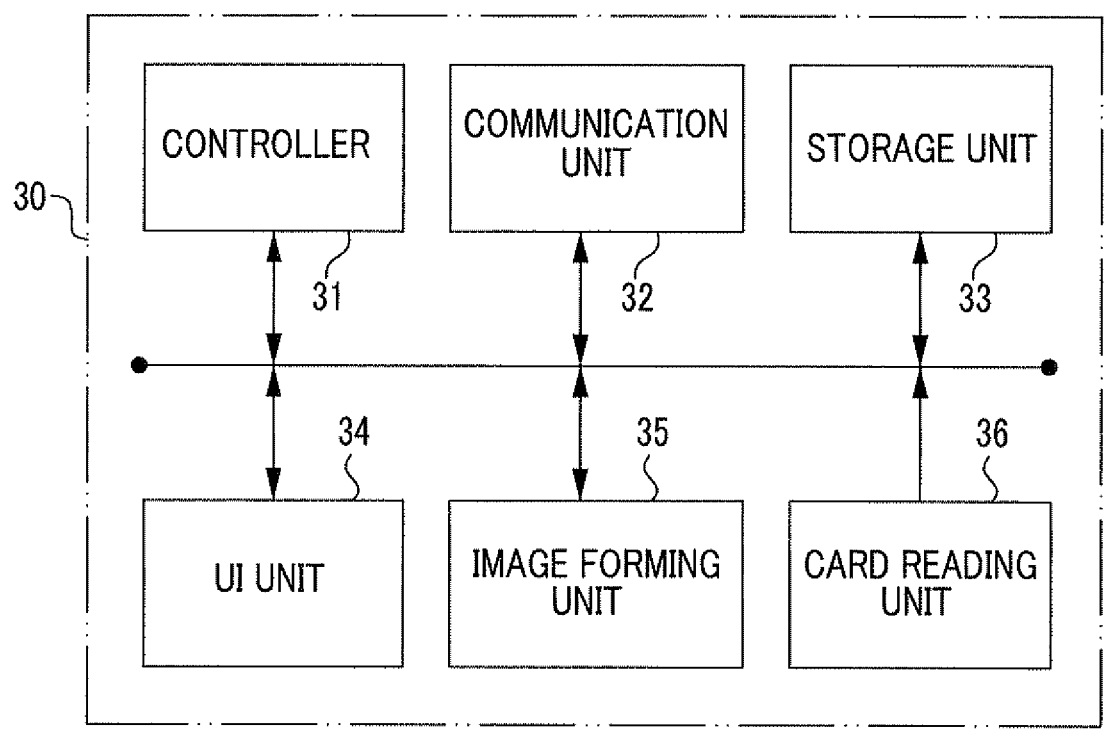
FIG. 4 is a diagram illustrating a hardware configuration of the image forming apparatus.

FIG. 4 is a diagram illustrating a hardware configuration of the image forming apparatus 30. The image forming apparatus 30 includes a controller 31, a communication unit 32, a storage unit 33, a UI (User Interface) unit 34, an image forming unit 35, and a card reading unit 36. The controller 31 controls the respective units of the image forming apparatus 30. The controller 31 includes, for example, a CPU and a memory. The CPU realizes functions of the controller 31 by executing a program stored in the memory. The communication unit 32 is a communication interface connected to the communication line 2. The image forming apparatus 30 communicates with the client apparatus 20 or another image forming apparatus 30 using the communication unit 32. The storage unit 33 is a storage device such as a hard disk or a flash memory. The storage unit 33 stores image data transmitted from the client apparatus 20.

The UI unit 34 includes, for example, a touch screen and an operation button. The UI unit 34 is used to operate the image forming apparatus 30. The image forming unit 35 is, for example, an electrophotographic printer. The image forming unit 35 forms (prints) an image corresponding to image data on a medium such as paper. The card reading unit 36 reads information stored an IC (Integrated Circuit) card, in a non-contact manner. The IC card is given to a user in advance in order to perform user authentication. In addition, in the following description, in a case where it is necessary to differentiate the configurations of the image forming apparatuses 30A, 30B, 30C and 30D from each other, description is made by adding the letters "A", "B", "C", and "D" to the respective reference numerals.

Figure 5:
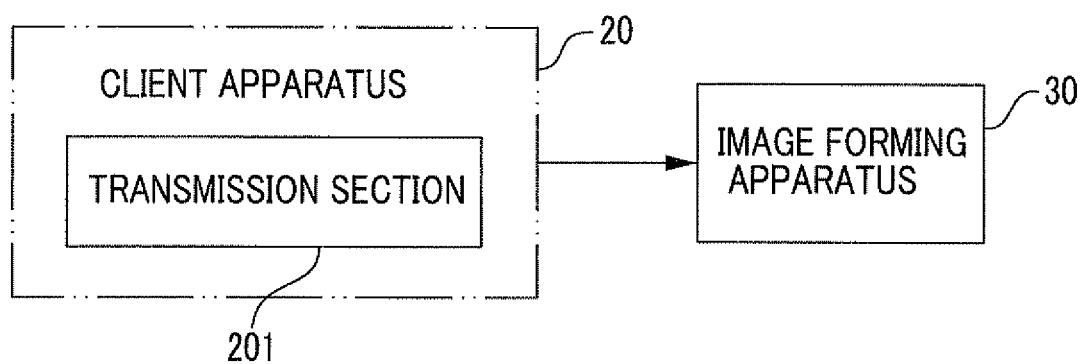
FIG. 5 is a diagram illustrating a functional configuration of the client apparatus.

FIG. 5 is a diagram illustrating a functional configuration of the client apparatus 20 (an example of the transmission apparatus). In the exemplary embodiment, a transmission section 201 is realized by the CPU 21 executing a program. The transmission section 201 transmits image data (printing data) to the image forming apparatus 30 included in the plural image forming apparatuses 30. In addition, the image data transmitted by the transmission section 201 is correlated with user ID (an example of user information) for identifying a preset user. Further, the transmission section 201 transmits the management table 41 (an example of the apparatus information) regarding the image forming apparatus 30 which is a transmission destination of the image data, to the plural image forming apparatuses 30.

Figure 6:
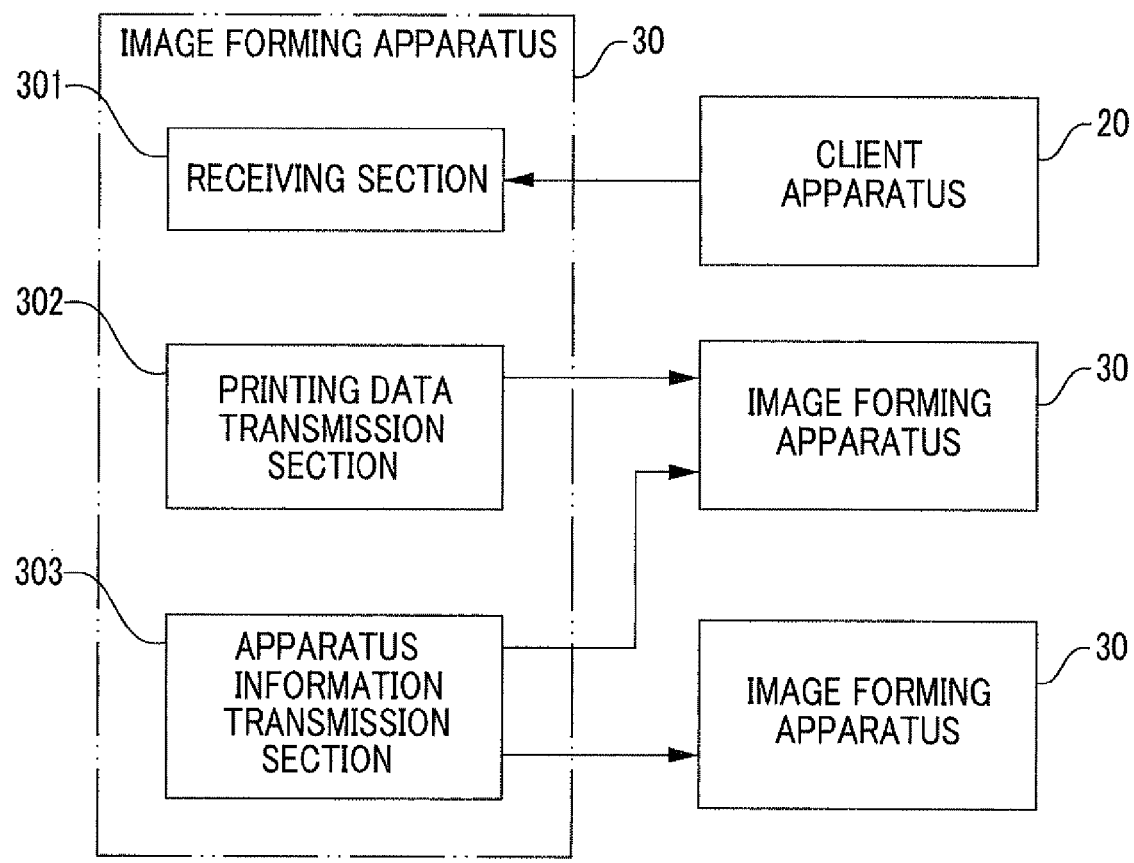
FIG. 6 is a diagram illustrating a functional configuration of the image forming apparatus storing image data.

FIG. 6 is a diagram illustrating a functional configuration of the image forming apparatus 30 storing image data. In the exemplary embodiment, a receiving section 301, a printing data transmission section 302, and an apparatus information transmission section 303 are realized by, for example, the CPU executing a program in the controller 31. In addition, such a functional configuration may be realized by a single image forming apparatus 30, or may be realized by cooperation of two or more image forming apparatuses 30 storing image data. The receiving section 301 receives image data from the client apparatus 20 or other image forming apparatuses 30. The printing data transmission section 302 transmits image data or substantially identical image data generated on the basis of the image data, to the image forming apparatuses 30 other than the own apparatus among the plural image forming apparatuses 30, in a case where image data which is substantially identical to the image data received by the receiving section 301 cannot be acquired from image forming apparatuses 30 corresponding to the predefined reference number among the plural image forming apparatuses 30. The apparatus information transmission section 303 transmits the management table 41 (an example of the apparatus information) regarding the image forming apparatuses 30 which receive the image data to the plural image forming apparatuses 30.

Figure 7:
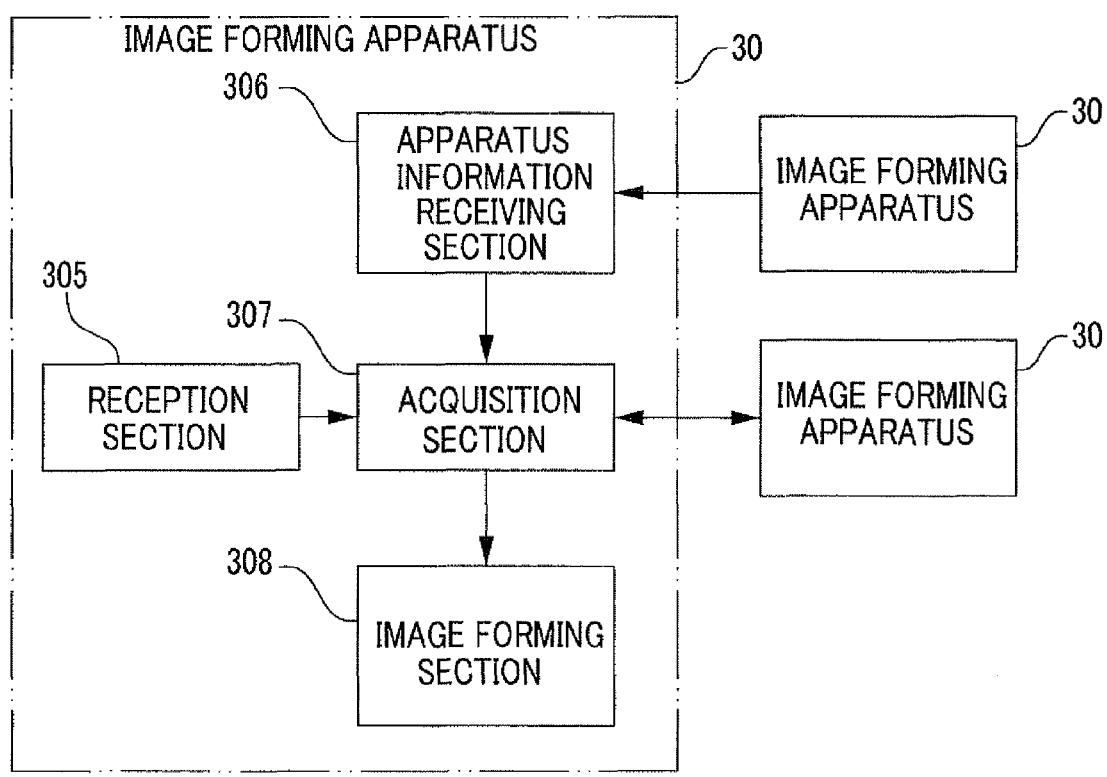
FIG. 7 is a diagram illustrating a functional configuration of the image forming apparatus.

FIG. 7 is a diagram illustrating a functional configuration of the image forming apparatus 30. In addition, in a case where image data is stored in the image forming apparatus 30, the image forming apparatus 30 has the functional configuration shown in FIG. 6 in addition to the functional configuration shown in FIG. 7. In the exemplary embodiment, a reception section 305 is realized by the card reading unit 36. In addition, an apparatus information receiving section 306 and an acquisition section 307 are realized by, for example, the CPU executing a program in the controller 31. An image forming section 308 is realized by the image forming unit 35. The reception section 305 receives an input of user information. The apparatus information receiving section 306 receives the management table 41 transmitted by the apparatus information transmission section 303 of another image forming apparatus 30. When used by a user, the acquisition section 307 acquires image data on the basis of the received management table 41. The image forming section 308 forms an image corresponding to the image data acquired by the acquisition section 307.

2. Operation of Image Forming System (1) Transmission Operation of Image Data

First, an operation when image data is transmitted from the client apparatus 20 to the image forming apparatus 30 will be described. FIG. 8 is a sequence diagram illustrating a transmission operation of the image data. A user operates the client apparatus 20 and instructs image data to be transmitted. At this time, the user designates image data which is to be printed using the operation unit 25. Here, it is assumed that image data D1 is designated by the user. If the transmission instruction is performed, the client apparatus 20 transmits the image data D1 to image forming apparatuses 30 corresponding to the reference number on the basis of the management table 41 stored in the storage unit 24. The reference number is set in advance. In the exemplary embodiment, the reference number is assumed to be set to "2". Further, attribute information is added to the image data D1. The attribute information includes information such as a file name for identifying the image data D1, and user ID "user A" of the user set in the client apparatus 20 in advance.

Specifically, the CPU 21 controls the communication unit 23 so as to send an inquiry about whether or not image data can be accumulated to the communication address "192.168.1.a" of the image forming apparatus 30A assigned the priority "1" in the management table shown in FIG. 3 (step S11). Here, it is assumed that power supply to the image forming apparatus 30A is disconnected. In this case, there is no response from the image forming apparatus 30A. In a case where a response is not made by the image forming apparatus 30A within the designated time, this process is timed out by the CPU 21 (step S12).

Next, the CPU 21 sends an inquiry about whether or not image data can be accumulated to the communication address "192.168.1.b" of the image forming apparatus 30B assigned the priority "2" in the management table shown in FIG. 3 (step S13). The image forming apparatus 30B is supplied with power and is thus in an available state. In this case, the controller 31B makes a response indicating that image data can be accumulated (step S14). In a case where the image forming apparatus 30B makes a response, the CPU 21 transmits the image data D1 designated by the user to the image forming apparatus 30B using the communication unit 23 (step S15). In addition, the CPU 21 updates the management table 41 stored in the storage unit so as to set a flag in the communication address "192.168.1.b" of the image forming apparatus 30B (step S16). Thereby, the flag is added to the communication address "192.168.1.b" of the image forming apparatus 30B. When receiving the image data D1 from the client apparatus 20, the image forming apparatus 30B stores the image data D1 in the storage unit 33B (step S17).

Next, the CPU 21 controls the communication unit 23 so as to send an inquiry about whether or not image data can be accumulated to the communication address "192.168.2.c" of the image forming apparatus 30C assigned the priority "3" in the management table shown in FIG. 3 (step S18). The image forming apparatus 30C is supplied with power and is thus in an available state. In this case, the controller 31C makes a response indicating that image data can be accumulated (step S19). In a case where the image forming apparatus 30C makes a response, the CPU 21 transmits the image data D1 designated by the user to the image forming apparatus 30C using the communication unit 23 (step S20). In addition, the CPU 21 updates the management table 41 stored in the storage unit 24, and sets a flag in the communication address "192.168.2.c" of the image forming apparatus 30C (step S21). Thereby, the flag is added to the communication address "192.168.2.c" of the image forming apparatus 30C. When receiving the image data D1 from the client apparatus 20, the image forming apparatus 30C stores the image data D1 in the storage unit 33C (step S22).

FIG. 9 is a diagram illustrating the management table 41 after being updated. In the management table 41, the flags are set in the communication addresses "192.168.1.b" and "192.168.2.c". This indicates that transmission destinations of the image data D1 are the image forming apparatus 30B and the image forming apparatus 30C. As such, if the flags corresponding to the reference number are set in the management table 41, the CPU 21 controls the communication unit 23 so as to transmit the management table 41 stored in the storage unit 24 to the image forming apparatuses 30A, 30B, 30C and 30D (step S23). The management table 41 is transmitted by, for example, broadcast. When receiving the management table 41 from the client apparatus 20, the image forming apparatuses 30B, 30C and 30D respectively store the management table 41 in the storage units 33B, 33C and 33D (step S24). In addition, the image forming apparatus 30A is in a power supply disconnection state and thus cannot receive the management table 41.

(2) Forwarding Operation of Image Data

After the image data transmitted from the client apparatus 20 is stored in the image forming apparatus 30, there are cases where the image forming apparatus 30 is in an unavailable state. The unavailable state refers to a state where an image cannot be formed through acquisition of the image data from the image forming apparatus 30. For example, in a case where power supply is disconnected, or a failure occurs, the image forming apparatus 30 is in an unavailable state. In this case, the image forming apparatus 30 storing the image data forwards the image data stored in the storage unit 33 to other image forming apparatuses 30 such that the image data is stored in the available image forming apparatuses 30 corresponding to a reference number. The reference number is set in advance. In the exemplary embodiment, the reference number is assumed to be set to "2".

First, a description will be made of an operation in a case where, after image data transmitted from the client apparatus 20 is stored in the image forming apparatuses 30B and 30C, an instruction for disconnecting power supply to the image forming apparatus 30B is performed. FIG. 10 is a sequence diagram illustrating an operation in this case. When the management table 41 is stored in step S24 described above, each image forming apparatus 30 determines whether or not the own apparatus takes the initiative. Specifically, the controller 31 determines whether or not a flag is set in the communication address of the own apparatus and the highest priority is assigned among communication addresses in which the flag is set (an example of the specific condition), in the management table 41 stored in the storage unit 33. In the management table 41 shown in FIG. 9, the flag is set in the communication address "192.168.1.b" of the image forming apparatus 30B and the communication address "192.168.2.c" of the image forming apparatus 30C. In addition, the priority "2" is correlated with the communication address "192.168.1.b" of the image forming apparatus 30B, and the priority "3" is correlated with the communication address "192.168.2.c" of the image forming apparatus 30C. In this case, among the communication addresses in which the flags are set, the highest priority is assigned to the communication address of the image forming apparatus 30B. For this reason, the image forming apparatus 30B determines that the own apparatus takes the initiative (step S31). Further, each image forming apparatus 30 measures update time T by setting a timer (step S32). In addition, if the update time T measured using the timer arrives, the image forming apparatus 30B transmits the management table 41 stored in the storage unit 33B to the other image forming apparatuses 30.

Figure 11:
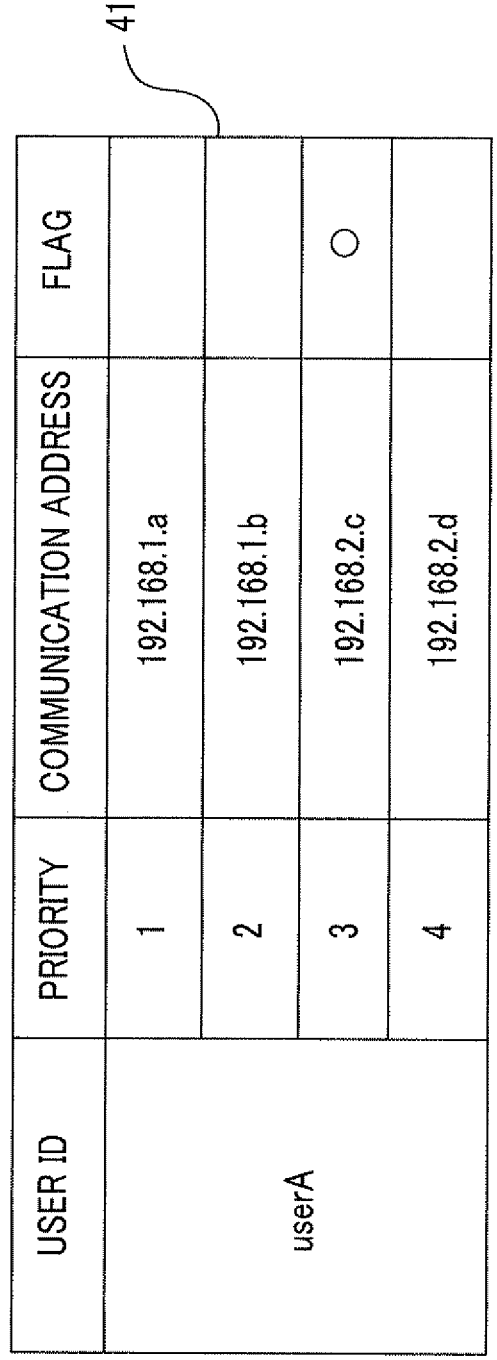
FIG. 11 is a diagram illustrating a management table after being updated.

Here, it is assumed that the timer is set in step S32 and then an instruction for disconnecting power supply to the image forming apparatus 30B is performed. In this case, the controller 31B, as shown in FIG. 11, updates the management table 41 stored in the storage unit 33B, and resets the flag set in the communication address "192.168.1.b" of the own apparatus (step S33). Thereby, the flag added to the communication address "192.168.1.b" of the image forming apparatus 30B is deleted. This indicates circumstances where the image data received by the image forming apparatus 30B cannot be acquired. Next, the controller 31B controls the communication unit 32B so as to transmit the updated management table 41 stored in the storage unit 33B to the image forming apparatuses 30A, 30C and 30D (step S34). The management table 41 is transmitted by, for example, broadcast. After transmitting the management table 41, power supply to the image forming apparatus 30B is disconnected (step S36).

When receiving the management table 41 from the image forming apparatus 30B, the image forming apparatuses 30C and 30D respectively store the management table 41 in the storage units 33C and 33D (step S35). In addition, the image forming apparatus 30A is in a power supply disconnection state and thus cannot receive the management table 41. The image forming apparatuses 30C and 30D determine whether or not the apparatuses themselves take the initiative on the basis of the stored management table 41 newly stored in the storage units 33C and 33D as described above. In the management table 41 shown in FIG. 11, the flag is set only in "192.168.2.c" of the image forming apparatus 30C. For this reason, the image forming apparatus 30C determines that the own apparatus takes the initiative (step S37).

As shown in FIG. 11, the number of flags set in the management table 41 is smaller than the reference number. This indicates a state where the image forming apparatus 30 storing the image data cannot be used. In this case, the image forming apparatus 30C forwards the image data D1 stored in the storage unit 33C to the other image forming apparatuses 30 such that the number of flags set in the management table 41 becomes the reference number. At this time, the image forming apparatus 30C transmits the image data stored in the storage unit 33C to another image forming apparatus 30 corresponding to "1" which is the difference between the reference number "2" and the number "1" of the flag set in the management table 41.

Specifically, the controller 31C controls the communication unit 32C so as to send an inquiry about whether or not image data can be accumulated to the communication address "192.168.1.a" of the image forming apparatus 30A assigned the priority "1" in the management table shown in FIG. 11 (step S38). Since power supply to the image forming apparatus 30A is disconnected, there is no response from the image forming apparatus 30A. In a case where a response is not made by the image forming apparatus 30A within the designated time, this process is timed out by the controller 31C (step S39).

Next, the controller 31C controls the communication unit 32C so as to send an inquiry about whether or not image data can be accumulated to the communication address "192.168.1.b" of the image forming apparatus 30B assigned the priority "2" in the management table shown in FIG. 11 (step S40). Since power supply to the image forming apparatus 30B is disconnected, there is no response from the image forming apparatus 30B. In a case where a response is not made by the image forming apparatus 30B within the designated time, this process is timed out by the controller 31C (step S41).

Next, the controller 31C sends an inquiry about whether or not image data can be accumulated to the communication address "192.168.2.d" of the image forming apparatus 30D assigned the priority "4" in the management table shown in FIG. 11 (step S42). In addition, the communication address assigned the priority "3" is a communication address of the own apparatus, and the inquiry is not sent. The image forming apparatus 30D is supplied with power and is thus in an available state. In this case, the image forming apparatus 30D makes a response indicating that image data can be accumulated (step S43). In a case where the image forming apparatus 30D makes a response, the controller 31C transmits the image data D1 stored in the storage unit 33C to the image forming apparatus 30D using the communication unit 32C (step S44). The image forming apparatus 30D stores the image data D1 received from the image forming apparatus 30C in the storage unit 33D (step S45). In addition, the controller 31C updates the management table 41 stored in the storage unit 33C so as to set a flag in the communication address "192.168.2.d" of the image forming apparatus 30D (step S46). Thereby, the flag is added to the communication address "192.168.2.d" of the image forming apparatus 30D.

FIG. 12 is a diagram illustrating the management table 41 after being updated. In the management table 41, the flags are set in the communication addresses "192.168.2.c" and "192.168.2.d". This indicates that the image data is received by the image forming apparatus 30C and the image forming apparatus 30D. As such, if the flags corresponding to the reference number are set in the management table 41, the controller 31C controls the communication unit 32C so as to transmit the management table 41 stored in the storage unit 24C to the image forming apparatuses 30A, 30B and 30D (step S47). The management table 41 is transmitted by, for example, broadcast. When receiving the management table 41 from the image forming apparatus 30C via the communication unit 32D, the controller 31D of the image forming apparatus 30D stores the management table 41 in the storage unit 33D (step S48). In addition, the image forming apparatuses 30A and 30B are in a power supply disconnection state and thus cannot receive the management table 41.

Figure 13:
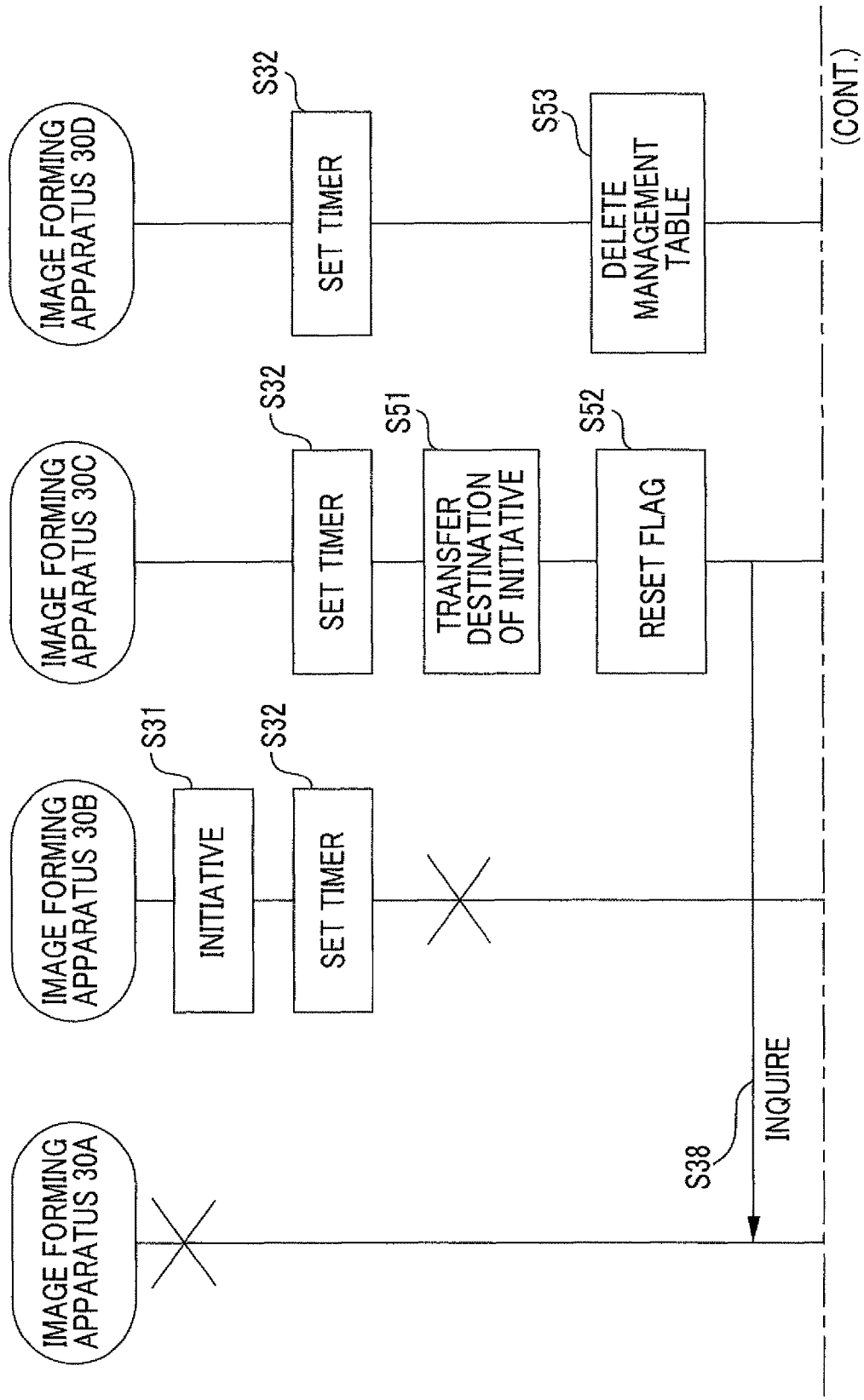
FIG. 13 is a sequence diagram illustrating a forwarding operation of image data.

Next, a description will be made of an operation in a case where, after image data transmitted from the client apparatus 20 is stored in the image forming apparatuses 30B and 30C, power supply to the image forming apparatus 30B is disconnected. The case where power supply is disconnected refers to a case where power supply is abruptly disconnected shortly after the image forming apparatus 30 performs a process, such as, for example, the plug being pulled out. FIG. 13 is a sequence diagram illustrating an operation in this case.

The image forming apparatus 30B transmits the management table 41 stored in the storage unit 33B to the other image forming apparatuses 30 at the predefined time interval. Specifically, when update time T measured by the timer arrives, the controller 31B controls the communication unit 32B so as to transmit the management table 41 stored in the storage unit 33B to the image forming apparatuses 30A, 30C and 30D. However, in a case where power supply to the image forming apparatus 30B is disconnected, the management table 41 is not transmitted even if the update time T measured by the timer has elapsed.

In this case, the image forming apparatuses 30C and 30D determine whether or not the own apparatuses are transfer destinations of the initiative. Specifically, the controllers 31C and 31D determine whether or not flags are set in the communication addresses of the own apparatuses and the second highest priority is assigned thereto among communication addresses in which the flag is set, in the management table 41 stored in the storage units 33C and 33D. For example, in the management table 41 shown in FIG. 9, the flag is set in the communication address "192.168.1.b" of the image forming apparatus 30B and the communication address "192.168.2.c" of the image forming apparatus 30C. In addition, the priority "2" is correlated with the communication address "192.168.1.b" of the image forming apparatus 30B, and the priority "3" is correlated with the communication address "192.168.2.c" of the image forming apparatus 30C. In this case, of the communication addresses in which the flags are set, the second highest priority is assigned to the communication address of the image forming apparatus 30C. Therefore, the image forming apparatus 30C determines that the own apparatus is a transfer destination of the initiative (step S51).

In this case, the controller 31C updates the management table 41 stored in the storage unit 33C, and resets the flag set in the communication address "192.168.1.b" of the image forming apparatus 30B (step S52). Thereby, the flag added to the communication address of the image forming apparatus 30B is deleted. As a result, as shown in FIG. 11, the number of flags set in the management table 41 is smaller than the reference number. In this case, the image forming apparatus 30C forwards the image data D1 stored in the storage unit 33C to the other image forming apparatuses 30 such that the number of flags set in the management table 41 becomes the reference number, in the same manner as steps S38 to S48 described above. In addition, the image forming apparatus 30D determines that the own apparatus is not a transfer destination. In this case, the controller 31D deletes the management table 41 stored in the storage unit 33D (step S53).

Next, a description will be made of an operation in a case where, after image data transmitted from the client apparatus 20 is stored in the image forming apparatuses 30B and 30C, power supply to the image forming apparatus 30C is disconnected. FIG. 14 is a sequence diagram illustrating an operation in this case. The image forming apparatus 30B transmits the management table 41 stored in the storage unit 33B to the other image forming apparatuses 30 at the predefined time interval. Specifically, when update time T measured by the timer arrives, the controller 31B controls the communication unit 32B so as to transmit the management table stored in the storage unit 33B to the image forming apparatuses 30A, 30C and 30D (step S61).

When receiving the management table 41 from the image forming apparatus 30B, the image forming apparatuses 30A, 30C and 30D make a response indicating that reception of the management table 41 is completed (step S62). The image forming apparatus 30D is supplied with power and is thus in an available state. In this case, the controller 31D (an example of the response unit) controls the communication unit 32D so as to transmit response information indicating that reception of the management table 41 is completed to the image forming apparatus 30D. In addition, the controller 31D stores the received management table 41 in the storage unit 33D (step S63). On the other hand, since power is not supplied to the image forming apparatuses 30A and 30C, a response indicating that reception of the management table 41 is completed is not made by the image forming apparatuses 30A and 30C. In this case, the image forming apparatus 30B determines that the image forming apparatuses 30A and 30C are in an unavailable state.

In a case where a response is not made from the image forming apparatus 30 in which a flag is set in the communication address in the management table 41 stored in the storage unit 33B, the image forming apparatus 30B updates the management table 41 so as to reset the flag (step S64). For example, in the management table 41 shown in FIG. 9, the flag is set in the communication address "192.168.2.c" of the image forming apparatus 30C. In this case, the controller 31B updates the management table 41 stored in the storage unit 33B and resets the flag set in the "192.168.2.c" of the image forming apparatus 30C. Thereby, the flag added to the communication address of the image forming apparatus 30C is deleted.

FIG. 15 is a diagram illustrating the management table 41 after being updated. A flag is set only in the communication address "192.168.1.b" in the management table 41. As such, in a case where the number of flags set in the management table 41 is smaller than the reference number, the image forming apparatus 30B forwards the image data D1 stored in the storage unit 33B to the other image forming apparatuses 30 such that the number of flags set in the management table 41 becomes the reference number.

Specifically, the controller 31B controls the communication unit 32B so as to send an inquiry about whether or not image data can be accumulated to the communication address "192.168.1.a" of the image forming apparatus 30A assigned the priority "1" in the management table shown in FIG. 15 (step S65). Since power supply to the image forming apparatus 30A is disconnected, there is no response from the image forming apparatus 30A. In a case where a response is not made by the image forming apparatus 30A within the designated time, this process is timed out by the controller 31B (step S66).

Next, the controller 31B controls the communication unit 32B so as to send an inquiry about whether or not image data can be accumulated to the communication address "192.168.2.c" of the image forming apparatus 30C assigned the priority "3" in the management table shown in FIG. 15 (step S67). In addition, the communication address assigned the priority "2" is a communication address of the own apparatus, and thus the inquiry is not sent. Since power supply to the image forming apparatus 30C is disconnected, there is no response from the image forming apparatus 30C. In a case where a response is not made by the image forming apparatus 30C within the designated time, this process is timed out by the controller 31B (step S68).

Next, the controller 31B sends an inquiry about whether or not image data can be accumulated to the communication address "192.168.2.d" of the image forming apparatus 30D assigned the priority "4" in the management table shown in FIG. 15 (step S69). The image forming apparatus 30D is supplied with power and is thus in an available state. In this case, the controller 30D makes a response indicating that image data can be accumulated (step S70). In a case where the image forming apparatus 30D makes a response, the controller 31B transmits the image data D1 stored in the storage unit 33B to the image forming apparatus 30D using the communication unit 32B (step S71). The image forming apparatus 30D stores the image data D1 received from the image forming apparatus 30B in the storage unit 33D (step S72). In addition, the controller 31B updates the management table 41 so as to set a flag in the communication address "192.168.2.d" of the image forming apparatus 30D (step S73). Thereby, the flag is added to the communication address "192.168.2.d" of the image forming apparatus 30D.

Figure 16:
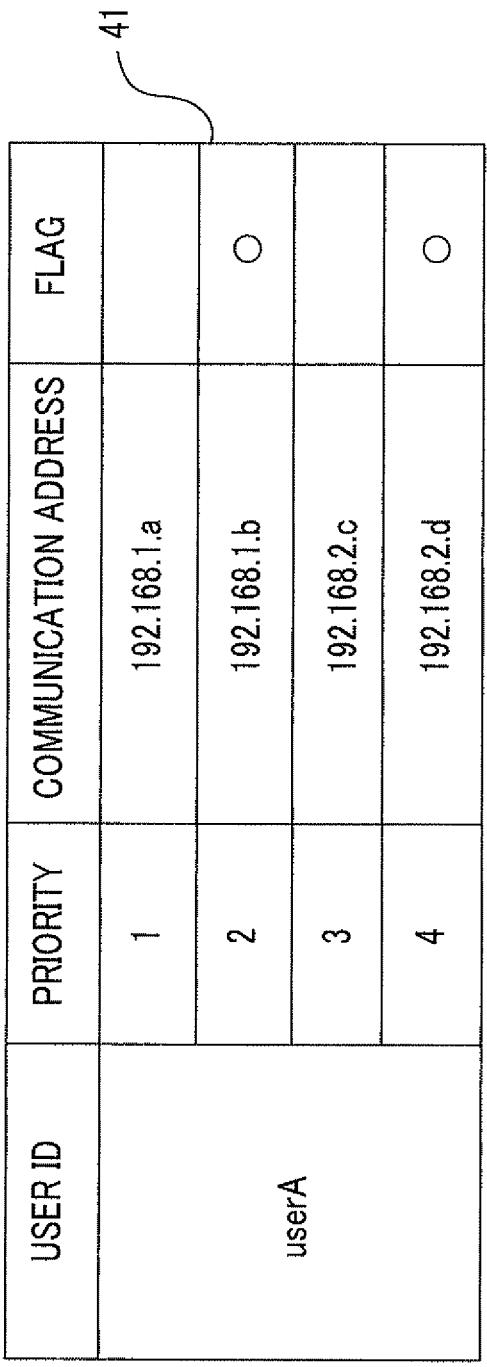
FIG. 16 is a diagram illustrating a management table after being updated.

FIG. 16 is a diagram illustrating the management table 41 after being updated. In the management table 41, the flags are set in the communication addresses "192.168.1.b" and "192.168.2.d". This indicates that the image data is received by the image forming apparatus 30B and the image forming apparatus 30D. As such, if the flags corresponding to the reference number are set in the management table 41, the controller 31B controls the communication unit 32B so as to transmit the management table 41 stored in the storage unit 24B to the image forming apparatuses 30A, 30C and 30D (step S74). The management table 41 is transmitted by, for example, broadcast. When receiving the management table 41 from the image forming apparatus 30B, the image forming apparatus 30D stores the management table 41 in the storage unit 33D (step S75). In addition, the image forming apparatuses 30A and 30C are in a power supply disconnection state and thus cannot receive the management table 41.

Figure 17:
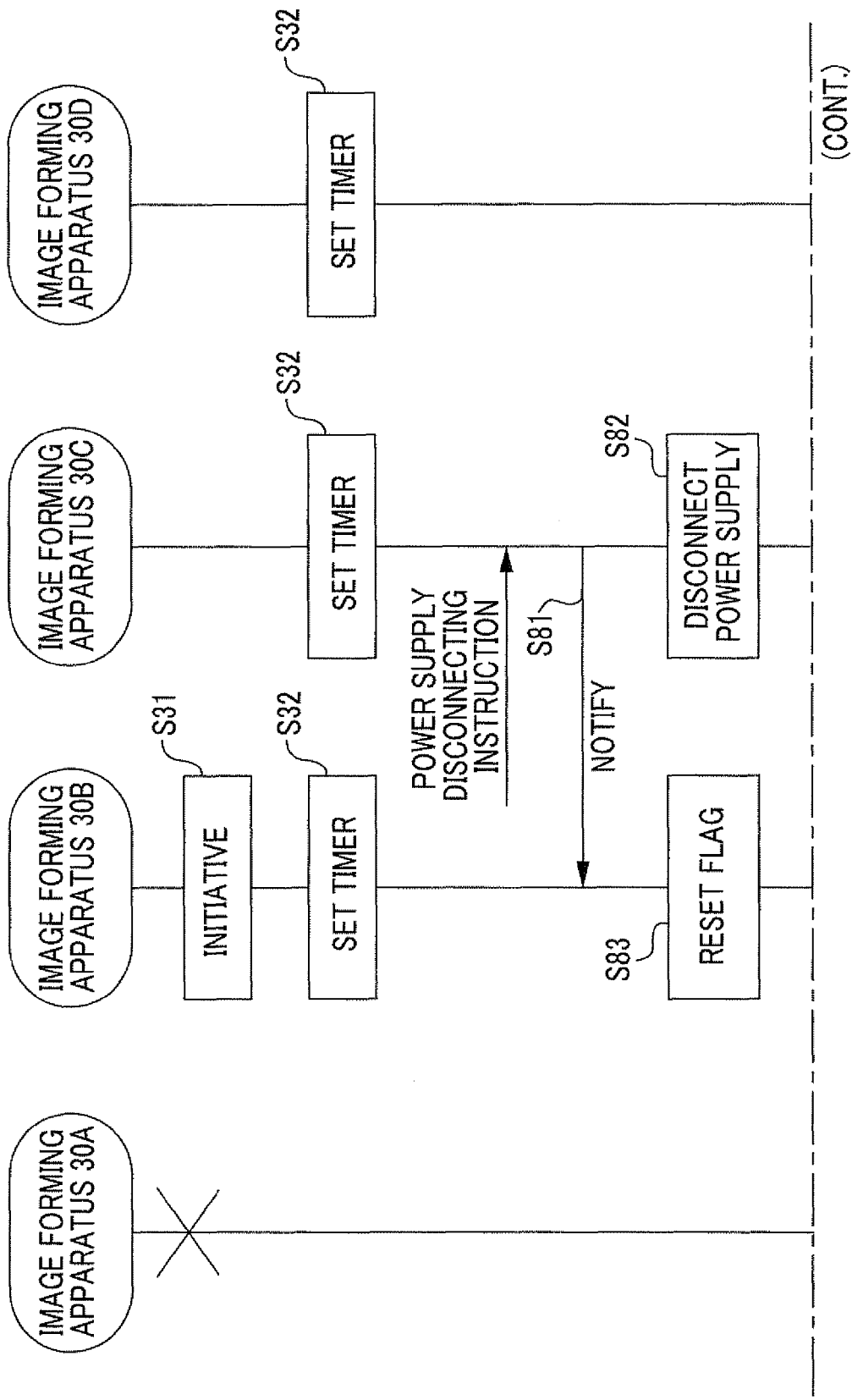
FIG. 17 is a sequence diagram illustrating a forwarding operation of image data.

Next, a description will be made of an operation in a case where, after image data transmitted from the client apparatus 20 is stored in the image forming apparatuses 30B and 30C, an instruction for disconnecting power supply to the image forming apparatus 30C is performed. FIG. 17 is a sequence diagram illustrating an operation in this case. Here, it is assumed that the timer is set in step S32 described above, and then an instruction for disconnecting power supply to the image forming apparatus 30C is performed. In this case, the controller 31C (an example of the notification unit) notifies the image forming apparatus 30B of a state where the own apparatus is unavailable (step S81). After notifying the image forming apparatus 30B of a state where the own apparatus is unavailable, power supply to the image forming apparatus 30C is disconnected (step S82).

When notified of a state where the own apparatus is unavailable by the image forming apparatus 30C, the image forming apparatus 30B updates the management table 41 stored in the storage unit 33B so as to reset the flag set in the communication address of the image forming apparatus 30C (step S83). Specifically, the controller 31A, as shown in FIG. 15, deletes the flag set in the communication address "192.168.2.c" of the image forming apparatus 30C in the management table 41. Thereby, the flag added to the communication address "192.168.2.c" of the image forming apparatus 30C is deleted. As a result, as shown in FIG. 15, the number of flags set in the management table 41 is smaller than the reference number. In this case, the image forming apparatus 30B forwards the image data D1 stored in the storage unit 33B to the other image forming apparatuses 30 such that the number of flags set in the management table 41 becomes the reference number, in the same manner as steps S65 to S75 described above.

(3) Printing Operation

Next, a printing operation when an image corresponding to the image data is formed will be described. FIG. 18 is a sequence diagram illustrating the printing operation. After performing a printing instruction by operating the client apparatus 20, the user selects a desired image forming apparatus 30 from the image forming apparatuses 30A, 30B, 30C and 30D, and moves to the image forming apparatus 30 in order to use the selected image forming apparatus 30. For example, the user moves to the image forming apparatus 30 which is near the user's seat and is the most convenient for use. Here, it is assumed that the user moves to the image forming apparatus 30A. In addition, it is assumed that power is supplied to the image forming apparatus 30A, and the management table 41 shown in FIG. 12 is stored in the storage unit 33 of each image forming apparatus 30.

An authentication screen is displayed on the UI unit 34A of the image forming apparatus 30A. The user inputs a user ID by touching the user's IC card on the card reading unit 36A. The IC card stores the user ID "user A" of the user. The image forming apparatus 30A performs user authentication on the basis of the input user ID (step S91). Specifically, the card reading unit 36A reads the user ID "user A" from the IC card. User IDs of users which are allowed to use the image forming apparatus 30A are registered in the image forming apparatus 30A in advance. The controller 31A determines whether or not the user ID "user A" input by the user is included in the user IDs which are registered in advance. If the user ID input by the user is not included in the user IDs which are registered in advance, the controller 31A displays a message indicating failure of the user authentication on the UI unit 34A, and finishes this process. In this case, the user cannot use the image forming apparatus 30A. On the other hand, if the user ID input by the user is included in the user IDs which are registered in advance, the controller 31A displays a message indicating that the user authentication is successful on the UI unit 34A.

If the user authentication is successful, the image forming apparatus 30A acquires a list of image data from the image forming apparatus 30 storing the image data corresponding to the user ID "user A". Specifically, the controller 31A specifies the communication address having the assigned highest priority of the communication addresses in which the flags are set in the management table 41 stored in the storage unit 33A. In the management table 41 shown in FIG. 12, the flags are set in the communication address "192.168.2.c" of the image forming apparatus 30C and the communication address "192.168.2.d" of the image forming apparatus 30D. In addition, the priority "3" is correlated with the communication address "192.168.2.c" of the image forming apparatus 30C, and the priority "4" is correlated with the communication address "192.168.2.d" of the image forming apparatus 30D. In this case, the controller 31A specifies the communication address "192.168.2.c" of the image forming apparatus 30C. The controller 31A controls the communication unit 32A so as to send a request for the list of the image data corresponding to the user ID "user A" to the communication address "192.168.2.c" of the image forming apparatus 30C (step S92).

The image forming apparatus 30C creates the list which is requested by the image forming apparatus 30A and transmits the list to the image forming apparatus 30A (step S93). Specifically, the controller 31C specifies image data including the user ID "user A" in the attribute information of image data stored in the storage unit 33C. The controller 31C arranges the attribute information added to the specified image data so as to create a list. The controller 31C controls the communication unit 32C so as to transmit the created list to the image forming apparatus 30A.

When the list is received from the image forming apparatus 30C, the image forming apparatus 30A displays the list on the UI unit 34A (step S94) The user selects desired image data on the basis of the list displayed on the UI unit 34A. In addition, the user operates the UI unit 34A and performs a printing instruction. Here, it is assumed that the user selects image data D1. When the printing instruction is performed, the image forming apparatus 30A acquires the image data D1 selected by the user. Specifically, the controller 31A controls the communication unit 32A so as to request the image forming apparatus 30C which is an acquisition destination of the list to transmit the image data D1 (step S95). The image forming apparatus 30C reads the image data D1 requested by the image forming apparatus 30A from the storage unit 33C and transmits the image data D1 to the image forming apparatus 30A (step S96). The controller 31A of the image forming apparatus 30A receives the image data D1 from the image forming apparatus 30C via the communication unit 32A.

When the image data D1 is acquired, the image forming apparatus 30A performs a printing process corresponding to the image data D1 (step S97). Specifically, the controller 31A supplies the image data D1 to the image forming unit 35A so as to form an image corresponding to the image data D1. The image forming unit 35A forms the image corresponding to the image data D1 on a medium under the control of the controller 31A. After performing the printing process, the controller 31A controls the communication unit 32A so as to request the image forming apparatuses 30B, 30C and 30D to delete the image data D1 (step S98). The deletion request is transmitted by, for example, broadcast. In a case where the image data D1 is stored in the storage units 33B, 33C and 33D, the image forming apparatuses 30B, 30C and 30D delete the image data D1 (step S99).

According to the exemplary embodiment, an image corresponding to image data is formed even if the image forming apparatus 30 cannot be used after the image data is transmitted from the client apparatus 20 to the image forming apparatus 30.

3. Modified Examples

The invention is not limited to the exemplary embodiment, and may be modified as follows. In addition, the following modified examples may be combined with each other.

(1) Modified Example 1

The above-described reference number is not limited to two. In a case of increasing redundancy, the reference number may be increased. In addition, the reference number may be set for each user. In this case, a reference number set for each user is stored in the management table 41. The controller 31 performs the above-described forwarding operation of image data on the basis of the reference number stored in the management table 41.

In addition, the reference number may be changed with time. In this case, the controller 31 (an example of the first changing unit) changes the reference number if the set time arrives. For example, there are cases where redundancy is desired to be increased on a Friday. In this case, the controller 31 increases the reference number on Fridays. In addition, the reference number may be changed depending on a priority of image data. In this case, the user sets a priority of image data when the user operates the client apparatus 20 and performs a printing instruction. The controller 31 (an example of the first changing unit) increases the reference number if the priority of the image data stored in the storage unit 33 is higher than a standard priority.

(2) Modified Example 2

The priority of the management table 41 may be changed depending on use history of the image forming apparatus 30. For example, the priority may be changed depending on the number of authentications of the image forming apparatus 30. In this case, the controller 31 records the number of authentications for performing user authentication for each user ID input by a user. The CPU 21 of the client apparatus 20 acquires the number of authentications corresponding to each user ID stored in the management table 41 from the image forming apparatuses 30A, 30B, 30C and 30D. The CPU 21 (an example of the second changing unit) changes the priority of the management table 41 such that the greater the number of authentications of the image forming apparatus 30, the higher the priority thereof is.

In addition, the priority may be changed depending on the number of printings of the image forming apparatus 30. In this case, the controller 31 records the number of printings for performing a printing process when a user ID is input, for each user ID input by a user. The CPU 21 of the client apparatus 20 acquires the number of printings corresponding to each user ID stored in the management table 41 from the image forming apparatuses 30A, 30B, 30C and 30D. The CPU 21 (an example of the second changing unit) changes a priority of the management table 41 such that the greater the number of printings of the image forming apparatus 30, the higher the priority thereof is.

In addition, a priority may be changed at a preset time. For example, there are cases where the image forming apparatus 30 which is supplied with power even at nighttime is preset. In this case, the CPU 21 (an example of the second changing unit) of the client apparatus 20 changes the priority assigned to the preset image forming apparatus 30 to "1" at nighttime.

(3) Modified Example 3

In the above-described printing operation, the image forming apparatus 30 may acquire image data from the image forming apparatus 30 disposed at the closest position of the image forming apparatuses 30 storing the image data corresponding to a user ID input by a user. In this case, disposition information indicating disposition of the image forming apparatuses 30 is stored in the storage units 33 of the image forming apparatuses 30. The controller 31 specifies the image forming apparatus 30 closest to the own apparatus at the disposition indicated by the disposition information, of the image forming apparatuses 30 having communication addresses in which flags are set in the management table 41. In addition, the controller 31 acquires the above-described list or image data from the specified image forming apparatus 30.

In addition, the image forming apparatus 30 may acquire image data from the plural image forming apparatuses 30 storing the image data corresponding to a user ID input by a user. For example, in a case where there are ten items of image data corresponding to the user ID, the controller 31 may acquire five items of image data from the single image forming apparatus 30 having the communication address in which a flag is set in the management table 41 and acquire the remaining five items of image data from the other image forming apparatuses 30 having the communication address in which the flag is set.

(4) Modified Example 4

The client apparatus 20 may transmit image data to the image forming apparatuses 30 corresponding to the number smaller than the reference number. In this case as well, in the same manner as the above-described exemplary embodiment, the image forming apparatus 30 taking the initiative forwards as above described such that the number of flags set in the management table 41 becomes the reference number.

(5) Modified Example 5

In the same manner as the above-described exemplary embodiment, in a case where image data transmitted from the client apparatus 20 is stored in the image forming apparatuses 30B and 30C, and then an instruction for disconnecting power supply to the image forming apparatus 30C is performed, the image forming apparatus 30C may perform the same operation as in the image forming apparatus 30B shown in FIG. 10. Specifically, when an instruction for disconnecting power supply is performed, in the same manner as step S33 described above, the controller 31C updates the management table 41 stored in the storage unit 33C so as to reset the flag set in the communication address "192.168.2.c" of the own apparatus. Next, the controller 31C, in the same manner as step S34 described above, controls the communication unit 32C so as to transmit the updated management table 41 to the image forming apparatuses 30R, 30B and 30D. In this case, the image forming apparatus 30B performs the operations in step S65 and thereafter.

(6) Modified Example 6

The above-described user ID is an example of the user information for identifying a user. The user information is not limited to the user ID. For example, the user information may be a card ID assigned to an IC card of the user, or may be a mail address assigned to the user. In addition, as described above, each person has the IC card, and thus a card ID assigned to the IC card may be used as the user information.

(7) Modified Example 7

The above-described user authentication may be performed without using the IC card. For example, the user may input a user ID of the user by the use of the UI unit 34 of the image forming apparatus 30. In addition, instead of the user ID, biological information, such as fingerprints, may be used. In this case, a device for reading the biological information is installed in the image forming apparatus 30.

(8) Modified Example 8

A configuration of the image forming system 1 is not limited to the configuration shown in FIG. 1. For example, the number of the image forming apparatuses 30 may be increased according to the number of users. In addition, the client apparatuses 20 may be provided in numbers corresponding to the number of users.

(9) Modified Example 9

The image forming unit 35 may be printer which forms an image by methods other than the electrophotographic method. In addition, the image forming unit 35 may be a printer which forms a monochrome image or a color image. The UI unit 34 has a touch panel but may have a display device such as a liquid crystal display device instead of the touch panel.

(10) Modified Example 10

The program executed by the CPU 21 or the CPU of the controller 31 may be provided in a state of being recorded on a recording medium such as a magnetic tape, a magnetic disk, a flexible disk, an optical disc, a magneto-optical disc, or a memory, and may be installed in the client apparatus 20 or the image forming apparatus 30. In addition, the program may be downloaded to the client apparatus 20 or the image forming apparatus 30 via a communication line such as the Internet.

(11) Modified Example 11

The image forming system 1 may include a higher-rank model image forming apparatus 30 (an example of the first image forming apparatus) and a lower-rank model image forming apparatus 30. The "lower-rank model" refers to, for example, a model which is inferior to the upper-rank model in functions, but is small-sized. In this case, the management table 41 is transmitted to the lower-rank model image forming apparatus 30 but image data is not sent or forwarded. When used by a user, the lower-rank model image forming apparatus 30 acquires image data from the upper-rank model image forming apparatus 30 on the basis of the management table 41, and performs a printing process. In other words, if the lower-rank image forming apparatus 30 can grasp which image forming apparatus 30 stores the image data on the basis of the management table 41, it may not include constituent elements for storing or transmitting the image data (for example, the apparatus information receiving section 301, the printing data transmission section 302, and the apparatus information transmission section 303, shown in FIG. 6).

(12) Modified Example 12

In the above-described exemplary embodiment, the image forming apparatus 30 transmits image data to the image forming apparatuses 30 other than the own apparatus in circumstances where the image data cannot be acquired from the image forming apparatuses 30 corresponding to the preset reference number. As circumstances where the image data cannot be acquired from the image forming apparatuses 30 corresponding to the preset reference number, there may be, for example, a case where the number of flags of the management table 41 is smaller than the reference number, or a case where the number of flags of the management table 41 is the reference number but image data cannot be acquired from the image forming apparatus 30 which receives the image data (for example, power supply to the image forming apparatus 30 is disconnected, errors occur in the communication line 2, or power is supplied to the image forming apparatus 30 but a service is not provided).

(13) Modified Example 13

When forwarding image data to the other image forming apparatuses 30, the image forming apparatus 30 may forward image data identical to the image data stored in the storage unit 33, or may forward substantially identical image data created on the basis of the image data stored in the storage unit 33. There are cases where parameters such as the creation date or the update date, which do not have a direct influence on image formation, are included in the image data. The "substantially identical image data" refers to data where data related to image formation is the same but data which does not have a direct influence on the image formation is different. For example, in a case where parameters such as the creation date or the update date are included in the image data stored in the storage unit 33, the controller 31 may create image data from which the parameters are deleted, and may forward the created image data to the other image forming apparatuses 30. In other words, in a case where a printing process is performed under the same conditions as the image data stored in the storage unit 33, the image forming apparatus 30 may transmit such image data that provides the same prints (media on which an image is formed), to the other image forming apparatuses 30.

(14) Modified Example 14

In the above-described exemplary embodiment, the image forming apparatuses 30 storing image data are grasped by exchanging the management tables 41. However, information used for this purpose is not limited to information in a list form such as the management table 41. For example, information (for example, a URL: Uniform Resource Locator) of a storage destination correlated with user information or image data may be used. In other words, apparatus information regarding the image forming apparatus 30 which receives image data may be transmitted to the plural image forming apparatuses 30.

(15) Modified Example 15

In the above-described exemplary embodiment, in a case where a certain image forming apparatus 30 is in an unavailable state, image data is forwarded by other image forming apparatuses 30. However, in this case, the image forming apparatus 30 itself which is in an unavailable state may forward the image data.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:

at least one transmission apparatus; and a plurality of image forming apparatuses, wherein the transmission apparatus includes a transmission section that transmits printing data to a first image forming apparatus of the plurality of image forming apparatuses, wherein the first image forming apparatus includes a receiving section that receives printing data from the transmission apparatus or other image forming apparatuses;

a printing data transmission section that distributes the printing data or substantially identical printing data generated on the basis of the printing data, to the image forming apparatuses other than an own apparatus among the plurality of image forming apparatuses, when printing data which is substantially identical to the printing data received by the receiving section cannot be acquired from the image forming apparatuses corresponding to a predefined reference number among the plurality of image forming apparatuses so that the predetermined reference number of the image forming apparatuses among the plurality of image forming apparatuses have the printing data or substantially identical printing data; and an apparatus information transmission section that transmits apparatus information regarding the image forming apparatus which receives the printing data to the plurality of image forming apparatuses, and wherein each of the plurality of image forming apparatuses includes an apparatus information receiving section that receives the apparatus information transmitted by the apparatus information transmission section;

an acquisition section that acquires the printing data on the basis of the received apparatus information in case that the printing data is used by a user; and an image forming section that performs image formation according to the printing data acquired by the acquisition section.

2. The image forming system according to claim 1, wherein the printing data transmitted from the transmission section is correlated with user information for identifying a preset user, wherein each of the plurality of image forming apparatuses includes a reception section that receives an input of the user information, and wherein the acquisition section acquires printing data corresponding to the input user information.

3. The image forming system according to claim 1, wherein, when the substantially identical printing data is received by a plurality of first image forming apparatuses, the apparatus information transmission section transmits the apparatus information at a predefined time interval when the own apparatus satisfies a specific condition, and the printing data transmission section transmits the printing data in a case where the apparatus information is not received from the first image forming apparatuses satisfying the specific condition even after the predefined time has elapsed.

4. The image forming system according to claim 3, wherein priorities are assigned to the first image forming apparatuses, wherein the specific condition is the highest priority of priorities assigned to the plurality of first image forming apparatuses receiving the substantially identical printing data, and wherein the image forming system further includes a second changing unit that changes the priorities depending on a time or use history of the first image forming apparatuses.

5. The image forming system according to claim 1, wherein, when the substantially identical printing data is received by a plurality of first image forming apparatuses, the apparatus information transmission section transmits the apparatus information at a predefined time interval when the own apparatus satisfies a specific condition, each of the plurality of image forming apparatuses includes a response unit that makes a response indicating that the apparatus information is received if the apparatus information is received, and the printing data transmission section transmits the printing data when the response is not made by the first image forming apparatuses other than the own apparatus in a case where the apparatus information is transmitted from the own apparatus.

6. The image forming system according to claim 1, wherein, when the substantially identical printing data is received by a plurality of first image forming apparatuses, each of the plurality of first image forming apparatuses includes a notification unit that notifies the first image forming apparatuses satisfying the specific condition of a state where the own apparatus cannot be used when the own apparatus is in an unavailable state in a case where the own apparatus does not satisfy the specific condition, and the printing data transmission section transmits the printing data when the first image forming apparatuses other than the own apparatus notify of the unavailable state in a case where the own apparatus satisfies the specific condition.

7. The image forming system according to claim 1, wherein the transmission section transmits the printing data to the first image forming apparatuses corresponding to the reference number, and transmits apparatus information regarding the first image forming apparatuses which are transmission destinations of the printing data, to the plurality of image forming apparatuses.

8. The image forming system according to claim 2, wherein the apparatus information transmission section transmits information indicating a circumstance where the received printing data cannot be acquired to the plurality of image forming apparatuses when the own apparatus cannot be used.

9. The image forming system according to claim 2, wherein, when the substantially identical printing data is received by a plurality of first image forming apparatuses, the apparatus information transmission section transmits the apparatus information at a predefined time interval when the own apparatus satisfies a specific condition, and the printing data transmission section transmits the printing data in a case where the apparatus information is not received from the first image forming apparatuses satisfying the specific condition even after the predefined time has elapsed.

10. The image forming system according to claim 2,
wherein, when the substantially identical printing data is received by a plurality of first image forming apparatuses,
the apparatus information transmission section transmits the apparatus information at a predefined time interval when the own apparatus satisfies a specific condition,
each of the plurality of image forming apparatuses includes a response unit that makes a response indicating that the apparatus information is received if the apparatus information is received, and
the printing data transmission section transmits the printing data when the response is not made by the first image forming apparatuses other than the own apparatus in a case where the apparatus information is transmitted from the own apparatus.

11. The image forming system according to claim 2, wherein the reference number is defined for each piece of user information correlated with the printing data, and
wherein the printing data transmission section transmits the printing data on the basis of the reference number defined for the user information correlated with the received printing data.

12. The image forming system according to claim 11, further comprising:
a first changing unit that changes the reference number depending on a time or a priority set in the printing data.

13. The image forming system according to claim 8,
wherein the printing data transmission section transmits the printing data when the own apparatus cannot be used.

14. The image forming system according to claim 8,
wherein, when the substantially identical printing data is received by a plurality of first image forming apparatuses,
the apparatus information transmission section transmits the apparatus information at a predefined time interval when the own apparatus satisfies a specific condition, and
the printing data transmission section transmits the printing data in a case where the apparatus information is not received from the first image forming apparatuses satisfying the specific condition even after the predefined time has elapsed.

15. The image forming system according to claim 8,
wherein, when the substantially identical printing data is received by a plurality of first image forming apparatuses,
the apparatus information transmission section transmits the apparatus information at a predefined time interval when the own apparatus satisfies a specific condition,
each of the plurality of image forming apparatuses includes a response unit that makes a response indicating that the apparatus information is received if the apparatus information is received, and
the printing data transmission section transmits the printing data when the response is not made by the first image forming apparatuses other than the own apparatus in a case where the apparatus information is transmitted from the own apparatus.

16. The image forming system according to claim 13,
wherein, when the substantially identical printing data is received by a plurality of first image forming apparatuses,
the apparatus information transmission section transmits the apparatus information at a predefined time interval when the own apparatus satisfies a specific condition, and
the printing data transmission section transmits the printing data in a case where the apparatus information is not received from the first image forming apparatuses satisfying the specific condition even after the predefined time has elapsed.

17. The image forming system according to claim 13,
wherein, when the substantially identical printing data is received by a plurality of first image forming apparatuses,
the apparatus information transmission section transmits the apparatus information at a predefined time interval when the own apparatus satisfies a specific condition,
each of the plurality of image forming apparatuses includes a response unit that makes a response indicating that the apparatus information is received if the apparatus information is received, and
the printing data transmission section transmits the printing data when the response is not made by the first image forming apparatuses other than the own apparatus in a case where the apparatus information is transmitted from the own apparatus.

* * * * *